(12) United States Patent
Garvey et al.

(10) Patent No.: US 11,514,641 B2
(45) Date of Patent: Nov. 29, 2022

(54) ERROR CONCEALMENT IN SPLIT RENDERING USING SHADING ATLASES

(71) Applicant: QUALCOMM Incorporated, San Diego, CA (US)

(72) Inventors: Joseph Daniel Garvey, San Diego, CA (US); Bojan Vrcelj, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 90 days.

(21) Appl. No.: 17/190,758

(22) Filed: Mar. 3, 2021

(65) Prior Publication Data
US 2022/0284665 A1 Sep. 8, 2022

(51) Int. Cl.
| | |
|---|---|
| G06T 15/80 | (2011.01) |
| G02B 27/01 | (2006.01) |
| G06T 19/00 | (2011.01) |
| G06T 5/00 | (2006.01) |

(52) U.S. Cl.
CPC .......... *G06T 15/80* (2013.01); *G02B 27/0172* (2013.01); *G06T 5/005* (2013.01); *G06T 19/006* (2013.01)

(58) Field of Classification Search
CPC ...... G06T 15/80; G06T 5/005; G02B 27/0172
See application file for complete search history.

(56) References Cited

U.S. PATENT DOCUMENTS

| | | |
|---|---|---|
| 2019/0037244 A1 | 1/2019 | Melkote Krishnaprasad et al. |
| 2019/0278083 A1 | 9/2019 | Mammou et al. |
| 2019/0347845 A1 | 11/2019 | Makar et al. |
| 2021/0312691 A1 | 10/2021 | Makar et al. |

FOREIGN PATENT DOCUMENTS

| | | | | |
|---|---|---|---|---|
| EP | 3796658 A1 * | 3/2021 | ........... | H04N 19/597 |
| WO | WO-0163561 A1 * | 8/2001 | ............. | G06T 15/06 |
| WO | 2021/021550 A1 | 2/2021 | | |

OTHER PUBLICATIONS

Mueller, J. H., Voglreiter, P., Dokter, M., Neff, T., Makar, M., Steinberger, M., & Schmalstieg, D. (2018). Shading atlas streaming. ACM Transactions on Graphics (TOG), 37(6), 1-16.*
Hladky, J., Seidel, H. P., & Steinberger, M. (Jul. 2019). Tessellated shading streaming. In Computer Graphics Forum (vol. 38, No. 4, pp. 171-182).*
International Search Report and Written Opinion dated May 13, 2022 from corresponding PCT Application No. PCT/US2022/070516.

\* cited by examiner

*Primary Examiner* — Sarah Lhymn
(74) *Attorney, Agent, or Firm* — Arent Fox, LLP

(57) ABSTRACT

A client device of a split rendering graphics processing architecture, receives an encoded shading atlas for a current frame. The encoded shading atlas is characterized by slices. The client decodes the received encoded shading atlas and identifies unsuccessfully decoded slices. The client then determines whether each patch of the decoded shading atlas intersects an identified unsuccessfully decoded slice. The client determines, for each intersecting patch, whether a prior valid version of each intersecting patch is stored at the client device. The client error conceals each intersecting patch having a prior valid version stored at the client device with the corresponding prior valid version to create an error concealed atlas. The client renders the current frame using the error concealed atlas.

28 Claims, 10 Drawing Sheets

ERROR CONCEALMENT IN SPLIT RENDERING USING SHADING ATLASES

TECHNICAL FIELD

The present disclosure relates generally to processing systems and, more particularly, to one or more techniques for graphics processing.

INTRODUCTION

Computing devices often utilize a graphics processing unit (GPU) to accelerate the rendering of graphical data for display. Such computing devices may include, for example, computer workstations, mobile phones such as so-called smartphones, embedded systems, personal computers, tablet computers, and video game consoles. GPUs execute a graphics processing pipeline that includes one or more processing stages that operate together to execute graphics processing commands and output a frame. A central processing unit (CPU) may control the operation of the GPU by issuing one or more graphics processing commands to the GPU. Modern day CPUs are typically capable of concurrently executing multiple applications, each of which may need to utilize the GPU during execution. A device that provides content for visual presentation on a display generally includes a GPU.

Typically, a GPU of a device is configured to perform the processes in a graphics processing pipeline. However, with the advent of wireless communication and smaller, handheld devices, there has developed an increased need for improved graphics processing.

SUMMARY

The following presents a simplified summary of one or more aspects in order to provide a basic understanding of such aspects. This summary is not an extensive overview of all contemplated aspects and is intended to neither identify key elements of all aspects nor delineate the scope of any or all aspects. Its sole purpose is to present some concepts of one or more aspects in a simplified form as a prelude to the more detailed description that is presented later.

In aspect of the technology disclosed herein, methods, computer-readable media, and an apparatuses are provided. A client device of a split rendering graphics processing architecture receives an encoded shading atlas for a current frame. The encoded shading atlas is characterized by slices. The client decodes the received encoded shading atlas and identifies unsuccessfully decoded slices. The client then determines whether each patch of the decoded shading atlas intersects an identified unsuccessfully decoded slice. The client determines, for each intersecting patch, whether a prior valid version of each intersecting patch is stored at the client device. The client error conceals each intersecting patch having a prior valid version stored at the client device with the corresponding prior valid version to create an error concealed atlas. The client renders the current frame using the error concealed atlas.

In some examples, the client device accumulates a list comprising a patch identifier for each patch of the shading atlas and a location in the shading atlas for the patch corresponding to each patch identifier. In such examples, determining whether each patch of the decoded shading atlas intersects an unsuccessfully decoded slice is based on the accumulated list.

In some examples, the client device each region of the error concealed atlas corresponding to an intersecting patch determined not to correspond to a prior valid version. In such examples, rendering the current frame further comprises rendering using in-painting for each indicated region.

In some examples, the prior valid version of the intersecting patch is the version of the intersecting patch used to render an immediately preceding frame. In some examples, the client device is a client device for an extended reality (XR) application, an augmented reality (AR) application, or a virtual reality (VR) application. In some examples, the client device is a client device in a cloud-assisted gaming architecture. In some such examples, the client device is a headset, a handset, a multimedia console, or a head mounted display (HMD).

In some examples, the client generates a replacement slice for at least one identified unsuccessfully decoded slice based on each error concealed patch corresponding to a patch determined to intersect the at least one identified unsuccessfully decoded slice. In such examples, decoding an encoded shading atlas for a subsequent frame based on the replacement slice.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
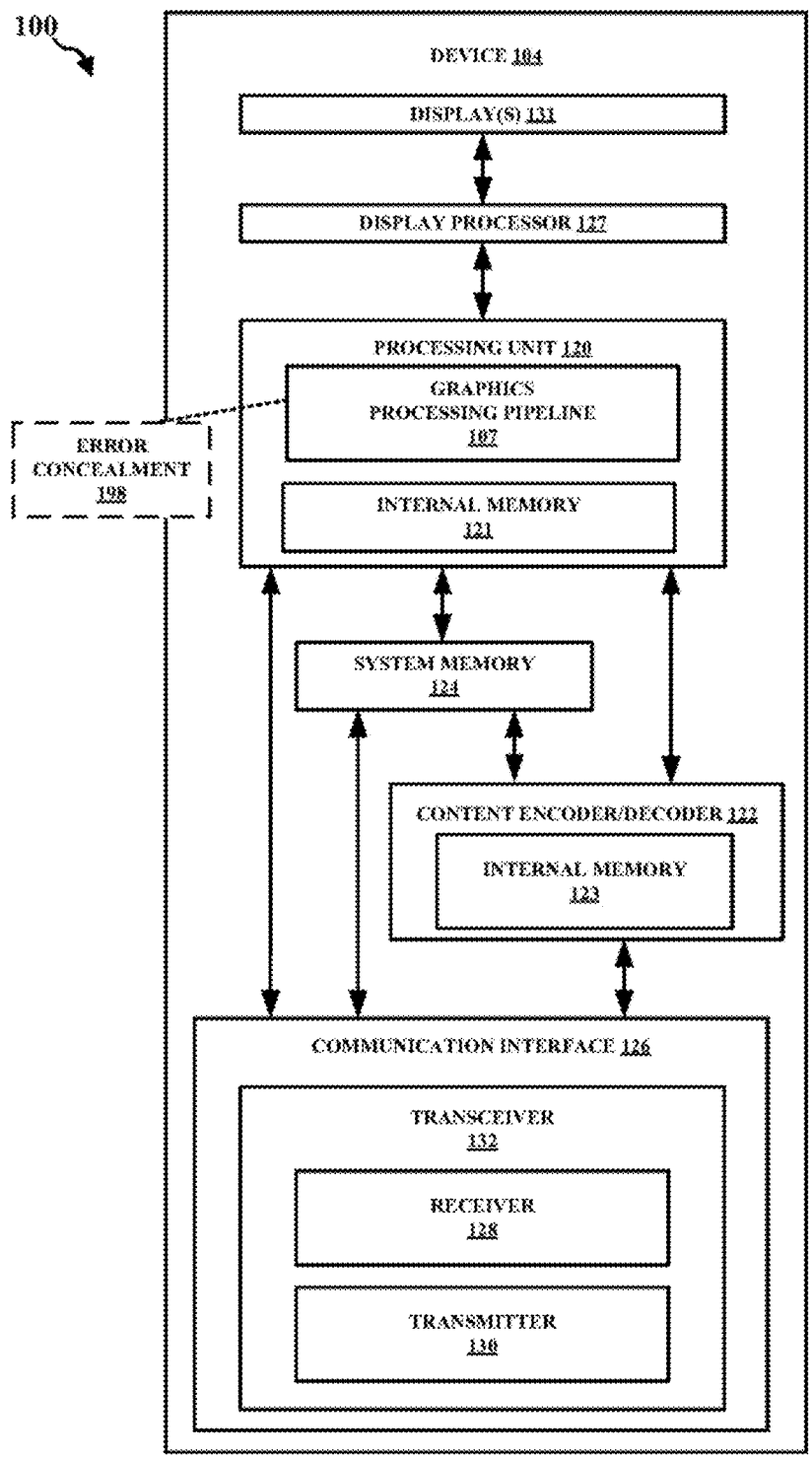
FIG. 1 is a block diagram that illustrates an example content generation system in accordance with one or more techniques of this disclosure.

Vector streaming systems can utilize a shading atlas, comprising patches (also referred to as "blocks"), that can be transported between a server and a client device. Also, some packets of the encoded shading atlas video stream may be dropped or not accurately received during transport. As a result of the dropped packets in the transport protocol one or more slices of the decoded shading atlas may be corrupt. "Slice" is used here to identify a spatially distinct region of a frame that is encoded separately from any other region in the same frame. In some instances, the video decoder has a capability to flag the output slices which are deemed unreliable or corrupt. The flagged corrupt slices may include a known subset of shading atlas patches. Some aspects of video transport systems can offer a level of resilience to network behavior, such as packet loss and/or increased delays over the network. In addition, the video streamed in vector streaming transport systems can have different properties compared to other systems. Aspects of the present disclosure can include an error concealment algorithm for vector streaming systems. In some such aspects, missing patches from a current shading atlas can be replaced using a previous successfully received version of the missing patch, in some examples, from a previous shading atlas. Throughout this application, the word "patch" is used to describe the smallest unit of information manipulated independently at the shading atlas organization stage. Elsewhere in the art of the technology disclosed herein, the word "block" also is used.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented, or a method may be practiced using any number of the aspects set forth herein. In addition, the scope of the disclosure is intended to cover such an apparatus or method that is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In general, this disclosure describes techniques for having a graphics processing pipeline in a single device or multiple devices, improving the rendering of graphical content, and/or reducing the load of a processing unit, i.e., any processing unit configured to perform one or more techniques described herein, such as a GPU. For example, this disclosure describes techniques for graphics processing in any device that utilizes graphics processing. Other example benefits are described throughout this disclosure.

As used herein, instances of the term "content" may refer to "graphical content," "products of 3D graphics design," their rendition, i.e., "images," and vice versa. This is true regardless of whether the terms are being used as an adjective, noun, or other parts of speech. In some examples, as used herein, the term "graphical content" may refer to a content produced by one or more processes of a graphics processing pipeline. In some examples, as used herein, the term "graphical content" may refer to a content produced by a processing unit configured to perform graphics processing. In some examples, as used herein, the term "graphical content" may refer to a content produced by a graphics processing unit.

In some examples, as used herein, the term "display content" may refer to content generated by a processing unit configured to perform displaying processing. In some examples, as used herein, the term "display content" may refer to content generated by a display processing unit. Graphical content may be processed to become display content. For example, a graphics processing unit may output graphical content, such as a frame, to a buffer (which may be referred to as a framebuffer). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling, e.g., upscaling or downscaling, on a frame. In some examples, a frame may refer to a layer. In other examples, a frame may refer to two or more layers that have already been blended together to form the frame, i.e., the frame includes two or more layers, and the frame that includes two or more layers may subsequently be blended.

FIG. 1 is a block diagram that illustrates an example system 100 configured to implement one or more techniques of this disclosure. The system 100 includes a device 104. The device 104 may include one or more components or circuits for performing various functions described herein. In some examples, one or more components of the device 104 may be components of an SOC. The device 104 may include one or more components configured to perform one or more techniques of this disclosure. In the example shown, the device 104 includes a processing unit 120, a content encoder/decoder 122, and a system memory 124. In some aspects, the device 104 can include a number of optional components, e.g., a communication interface 126, a transceiver 132, a receiver 128, a transmitter 130, a display processor 127, and one or more displays 131. Reference to the display 131 may refer to the one or more displays 131. For example, the display 131 may include a single display or multiple displays. The display 131 may include a first display and a second display. The first display may be a left-eye display and the second display may be a right-eye display. In some examples, the first and second display may receive different frames for presentment thereon. In other examples, the first and second display may receive the same frames for presentment thereon. In further examples, the results of the graphics processing may not be displayed on the device, e.g., the first and second display may not receive any frames for presentment thereon. Instead, the frames or graphics processing results may be transferred to another device. In some aspects, this can be referred to as split rendering.

The processing unit 120 may include an internal memory 121. The processing unit 120 may be configured to perform graphics processing, such as in a graphics processing pipeline 107. The content encoder/decoder 122 may include an internal memory 123. In some examples, the device 104 may include a display processor, such as the display processor 127, to perform one or more display processing techniques on one or more frames generated by the processing unit 120 before presentment by the one or more displays 131. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of: a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 and the content encoder/decoder 122 may be communicatively coupled to the system memory 124 over a bus. In some examples, the processing unit 120 and the content encoder/decoder 122 may be communicatively coupled to each other over the bus or a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, SRAM, DRAM, erasable programmable ROM (EPROM), electrically erasable programmable ROM (EEPROM), flash memory, a magnetic data media or an optical storage media, or any other type of memory.

The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a central processing unit (CPU), a graphics processing unit (GPU), a general purpose GPU (GPGPU), or any other processing unit that may be configured to perform graphics processing. In some examples, the processing unit 120 may be integrated into a motherboard of the device 104. In some examples, the processing unit 120 may be present on a graphics card that is installed in a port in a motherboard of the device 104 or may be otherwise incorporated within a peripheral device configured to interoperate with the device 104. The processing unit 120 may include one or more processors, such as one or more microprocessors, GPUs, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the system 100 can include an optional communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the graphics processing pipeline 107 may include an error concealment component 198 configured to receive, as part of a vector streaming split rendering process, a bit stream encoding a sequence of shading atlases of the process. Each shading atlas includes patches—described further in conjunction with FIG. 4. The client decodes a particular shading atlas of the sequence of shading atlases, and determines that a particular patch of the particular shading atlas was unsuccessfully decoded. The client identifies a stored patch of a prior shading atlas of the sequence of shading atlases as a successfully decoded earlier version of the particular patch. The client then renders the particular shading atlas using the stored patch instead of the particular patch. In some examples, the client, prior to decoding the particular shading atlas, decodes the prior shading atlas. The client determines that a plurality of patches, including an earlier version of the particular patch in the prior shading atlas, were successfully decoded. The client stores each of the plurality of patches, including the earlier version of the particular patch, determined to have been successfully decoded.

As described herein, a device, such as the device 104, may refer to any device, apparatus, or system configured to perform one or more techniques described herein. For example, a device may be a server, a base station, user equipment, a client device, a station, an access point, a computer, e.g., a personal computer, a desktop computer, a laptop computer, a tablet computer, a computer workstation, or a mainframe computer, an end product, an apparatus, a phone, a smart phone, a server, a video game platform or console, a handheld device, e.g., a portable video game device or a personal digital assistant (PDA), a wearable computing device, e.g., a smart watch, an augmented reality device, or a virtual reality device, a non-wearable device, a display or display device, a television, a television set-top box, an intermediate network device, a digital media player, a video streaming device, a content streaming device, an in-car computer, any mobile device, any device configured to generate graphical content, or any device configured to perform one or more techniques described herein. Processes herein may be described as performed by a particular component (e.g., a GPU), but, in further examples, can be performed using other components (e.g., a CPU), consistent with disclosed examples.

GPUs can process multiple types of data or data packets in a GPU pipeline. For instance, in some aspects, a GPU can process two types of data or data packets, e.g., context register packets and draw call data. A context register packet can be a set of global state information, e.g., information regarding a global register, shading program, or constant data, which can regulate how a graphics context will be processed. For example, context register packets can include information regarding a color format. In some aspects of context register packets, there can be a bit that indicates which workload belongs to a context register. Also, there can be multiple functions or programming running at the same time and/or in parallel. For example, functions or programming can describe a certain operation, e.g., the color mode or color format. Accordingly, a context register can define multiple states of a GPU.

Context states can be utilized to determine how an individual processing unit functions, e.g., a vertex fetcher (VFD), a vertex shader (VS), a shader processor, or a geometry processor, and/or in what mode the processing unit functions. In order to do so, GPUs can use context registers and programming data. In some aspects, a GPU can generate a workload, e.g., a vertex or pixel workload, in the pipeline based on the context register definition of a mode or state. Certain processing units, e.g., a VFD, can use these states to determine certain functions, e.g., how a vertex is assembled.

As these modes or states can change, GPUs may need to change the corresponding context. Additionally, the workload that corresponds to the mode or state may follow the changing mode or state.

GPUs can render images in a variety of different ways. In some instances, GPUs can render an image using rendering or tiled rendering. In tiled rendering GPUs, an image can be divided or separated into different sections or tiles. After the division of the image, each section or tile can be rendered separately. Tiled rendering GPUs can divide computer graphics images into a grid format, such that each portion of the grid, i.e., a tile, is separately rendered. In some aspects, during a binning pass, an image can be divided into different bins or tiles. Moreover, in the binning pass, different primitives can be shaded in certain bins, e.g., using draw calls. In some aspects, during the binning pass, a visibility stream can be constructed where visible primitives or draw calls can be identified.

In some aspects of rendering, there can be multiple processing phases or passes. For instance, the rendering can be performed in two passes, e.g., a visibility pass and a rendering pass. During a visibility pass, a GPU can input a rendering workload, record the positions of primitives or triangles, and then determine which primitives or triangles fall into which portion of a frame. In some aspects of a visibility pass, GPUs can also identify or mark the visibility of each primitive or triangle in a visibility stream. During a rendering pass, a GPU can input the visibility stream and process one portion of a frame at a time. In some aspects, the visibility stream can be analyzed to determine which primitives are visible or not visible. As such, the primitives that are visible may be processed. By doing so, GPUs can reduce the unnecessary workload of processing or rendering primitives that are not visible.

In some aspects, rendering can be performed in multiple locations and/or on multiple devices, e.g., in order to divide the rendering workload between different devices. For example, the rendering can be split between a server and a client device, which can be referred to as "split rendering." In some instances, split rendering can be a method for bringing content to user devices or head mounted displays (HMDs), where a portion of the graphics processing can be performed outside of the device or HMD, e.g., at a server.

Split rendering can be performed for a number of different types of applications, e.g., virtual reality (VR) applications, augmented reality (AR) applications, and/or extended reality (XR) applications, cloud gaming applications. In VR applications, the content displayed at the user device can correspond to man-made or animated content, e.g., content rendered at a server or user device. In AR or XR content, a portion of the content displayed at the user device can correspond to real-world content, e.g., objects in the real world, and a portion of the content can be man-made or animated content. Also, the man-made or animated content and real-world content can be displayed in an optical see-through or a video see-through device, such that the user can view real-world objects and man-made or animated content simultaneously. In some aspects, man-made or animated content can be referred to as virtual content, or vice versa.

Some aspects of the present disclosure can consider different types of modalities of split XR or AR architecture, e.g., pixel streaming (PS) architecture and object-space representation based split rendering (OSRBSR). Vector streaming (VS), described below, is one such example of an OSRBSR architecture. In PS systems, content latency may be compensated using a variant of asynchronous time-warping (ATW) on the client prior to the display. For example, time-warping may distort the shape of the original rendered content or computer generated imagery (CGI). In other examples, the content re-projected to a more recent display pose using ATW or other advanced re-projection techniques may suffer from inconsistent dis-occlusions—the effect where content occluded by a foreground object from the viewpoint at the time of content rendering, and dis-occluded in a later viewpoint close to the time of display cannot be faithfully represented in the displayed content. In some aspects, in an AR system, the PS frames that are streamed to the client may be time-warped based on a view transformation. For example, aspects of the present disclosure can perform a time projection such that the location of future frames can be determined based on the estimated future camera position.

As indicated herein, vector streaming is a type of split rendering system designed to offer improved latency tolerance and/or bandwidth usage for XR, AR, or VR traffic compared to traditional approaches, such as pixel streaming. As mentioned above, in pixel streaming, the server can render one or more frames, e.g., via eye buffers that represent videos that are represented through each eye. In some instances of pixel streaming, there can be a latency amount between the frame rendering time e.g., on the server, and the frame display time, e.g., on the client. This latency can be compensated by ATW, which results in an approximation of what image should be displayed had the delay been nonexistent, i.e., ideal display content. The longer the delay, the more the approximation may diverge from the imaginary ideal display content. At some point (and for some display values) this divergence becomes apparent.

In vector streaming systems, the server can stream the appearance of the virtual or CGI surfaces, as well as the geometry/meshes of these virtual objects. In the latter stages of device processing, e.g., prior to transferring information to the display, the client can rasterize the geometry of the visible virtual objects, using the most recent head pose, and/or texture-map the corresponding textures. This variant of latency compensation may not distort the shape of the objects and the boundaries between the foreground and background content, and thus, remain a more accurate depiction of the visible scene.

Vector streaming systems can also stream different types of information. For instance, in vector streaming architecture, a server can produce shading atlas information, e.g., a representation of the textures in the object space of potentially visible surfaces in the scene. It can also stream meta-information, e.g., a mapping between the individual portions of the shading atlas to the corresponding subsets of the virtual object meshes, e.g., triangles, or polygons. The client device can receive the updated shading atlas information, the newly visible geometry/mesh information, and the corresponding meta-information in every frame sent by the server. The client device can then rasterize the currently visible meshes using the latest device pose and it can utilize the shading atlas information and/or the meta-information to texture-map the shaded surfaces from atlas space to the final screen space, thus converting this information into pixels that can be displayed on the client device (or elsewhere). The frequency of the server frames may not correspond to the frequency of the frames displayed on the client. In particular, server frame frequency can be lower: in some instances, it can correspond to ½, ⅓, ¼, or ⅕ of the targeted device-display frequency that may translate to bandwidth savings compared to pixel streaming.

In addition to sending the object meshes for faithful representation of shapes beyond what is visible from any one viewpoint, vector streaming system also transports the corresponding shaded surfaces, thus enabling the client to reconstruct accurately the virtual scene from all nearby viewpoints. Since the transported shaded surfaces are typically not all visible from any one viewpoint, they cannot be jointly represented in screen space, but are jointly stored in a shading atlas.

Figure 2A:
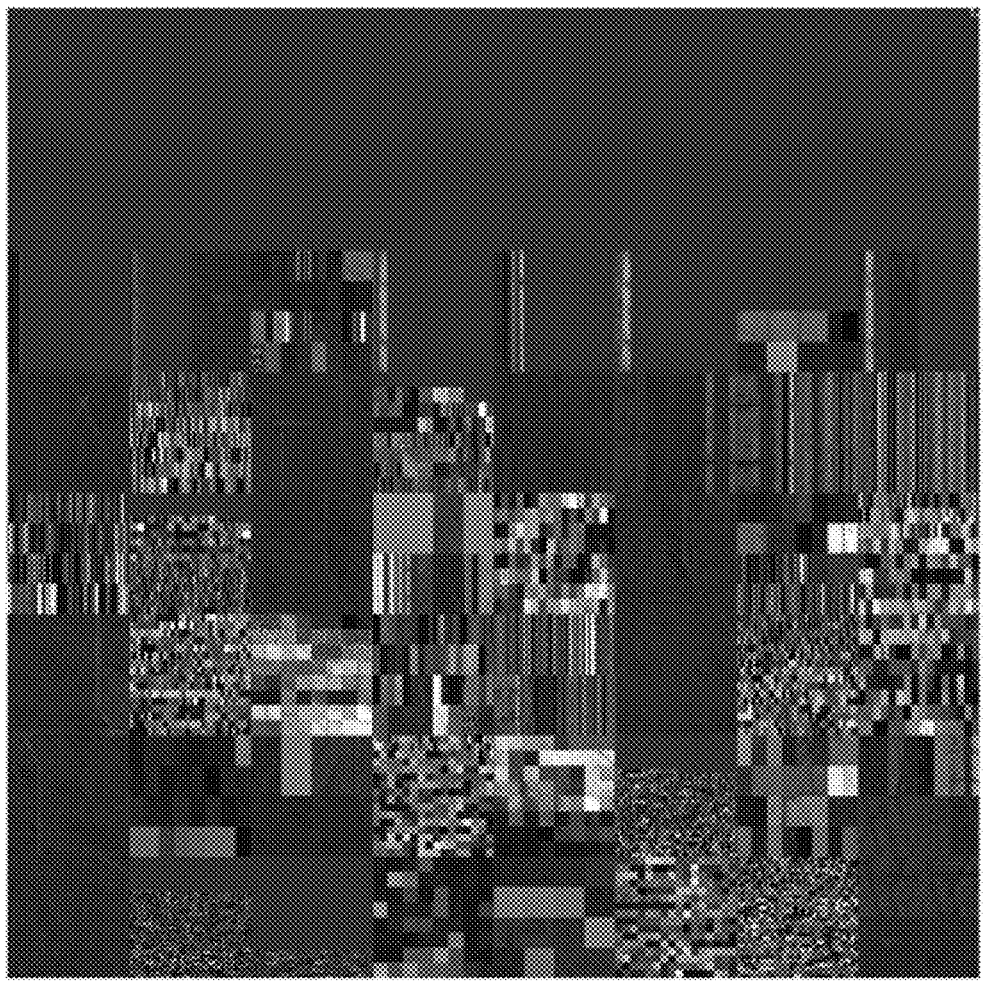
FIG. 2A illustrates an example shading atlas in accordance with one or more techniques of this disclosure.

Referring to FIG. 2A, and continuing to refer to FIG. 1 for context, a shading atlas 200 is illustrated, in accordance with one or more techniques of this disclosure. As shown in FIG. 2A, shading atlas 200 illustrates an efficient way of storing textures rendered in object space and intended for screen-space display. FIG. 2A also shows that different portions of shading atlas 200 are shaded at different resolutions, e.g., depending on a distance from a camera. Also, the dark gray portions of shading atlas 200 (e.g., the shade of gray on the far right side of FIG. 2A) can represent unallocated portions of the shading atlas 200. In some instances, shading atlas 200 can be efficiently encoded due to a high temporal coherence. For example, one patch in shading atlas 200 can represent the same physical surface in a virtual world over a period of time. In some aspects, the patches in the shading atlas 200 can remain in the same place for as long as they are potentially visible and occupying a similar area in a screen space. Such patches would maintain a similar appearance with gradual and typically slight changes in shading. These properties result in high temporal correlation of the shading atlas as a whole.

Figure 2B:
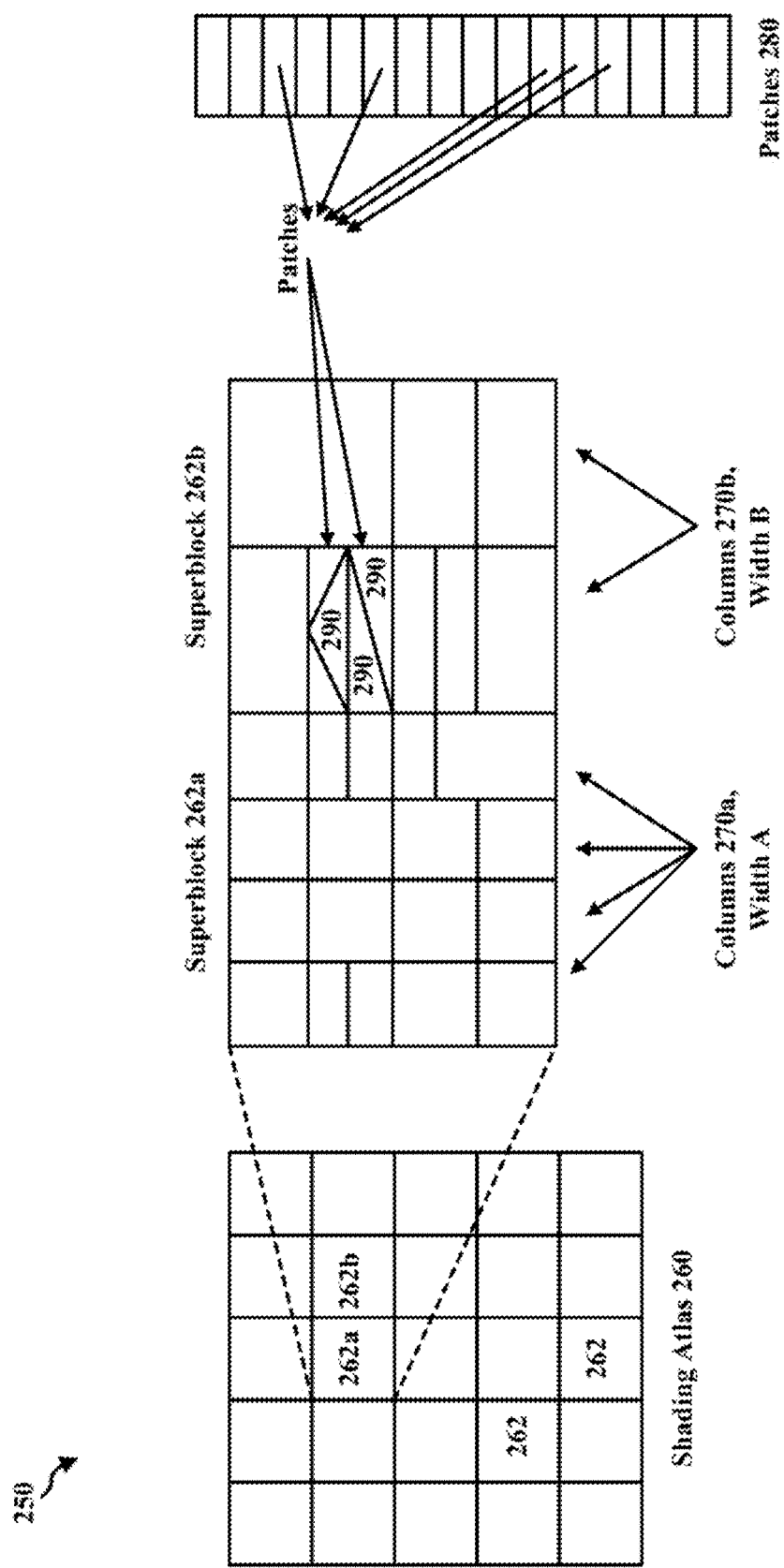
FIG. 2B illustrates an example shading atlas organization in accordance with one or more techniques of this disclosure.

Referring to FIG. 2B, and continuing to refer to prior figures for context, shading atlas organization 250 is illustrated, in accordance with one or more techniques of this disclosure. As shown in FIG. 2B, shading atlas 260 includes superblocks 262, with each superblock including blocks/patches of different width. Blocks of the same width are organized in columns 270, and columns 270 of a certain width are all allocated in a same superblock. Thus, this structure including columns 270a of width A and columns 270b of width B may be split between two superblocks—262a and 262b, respectively. Each column further includes patches 280, which are the basic elements of the shading atlas organization. In some aspects, column widths can be restricted to be a power of two (in pixel count). Thus, for example, column width A can be half the value of column width B. As shown in FIG. 2B, the organization of the shading atlas from large to small values can be superblocks 262 to columns 270 to patches 280 to triangles 290.

With regard to patches 280 and triangles 290, each patch 280 consists of a number of triangles 290. Triangles 290 are the smallest unit of graphical information from rendering point of view. But for the purpose of more efficient packing in a video frame—like data structure (which is always a rectangle) it is beneficial to group triangles 290 into rectangular entities—patches 280. Thus, from shading atlas 260 organization viewpoint a patch 280 is the smallest individually addressable element. The smallest number of triangles 290 making a patch can be one, though this is sort of a degenerate case and leads to inefficiency (part of rectangle area is unused). Thus, a common and desirable case would be two triangles 290 efficiently packed to exactly cover the rectangle of the patch 280. This can also be extended to 3-triangle 290 patches 280, 4-triangle 290 patches 280, and so forth.

FIG. 2B illustrates how patches 280 are packed efficiently into shading atlas 260. Moreover, this hierarchy of memory management allows for extensive parallelism when deciding how to organize patches 280 in a shading atlas 260. The memory organization of the shading atlas may be as follows.

The atlas includes superblocks which are further divided into columns (of equal width), and each column includes stacked patches. Patches are of rectangular shape (square being a special case), and they can include a certain fixed number of triangles. This is shown in the portion of FIG. 2B depicting the columns of width B where a few patches are shown to include a number of triangles, e.g., triangles 290. For example, a patch 280 can consist of one, two, or three triangles 290. In some implementations, patch constellations including more than three triangles may also be possible. The triangle-to-patch assignment is chosen once during asset loading and scene preprocessing (e.g., performed offline) and beyond that point, it remains fixed for the duration of the split rendering service. In some aspects, the triangle-to-patch mapping operation is separate from the online memory organization of patches into shading atlas, as depicted in FIG. 2B. In one instance, the triangles assigned to one patch may be chosen such that they are neighbors in the object mesh, their aspect ratios may be "compatible" to the chosen patch constellation, their sizes/areas may be in similar proportion as that of the canonical triangles arranged within a patch, and their surface normals may be similar. The triangle-to-patch assignment may be based purely on mesh properties, thus in the object space and as such may be done before the service starts. As opposed to that, the assignment of patches to superblocks may change over time, such assignment is tightly coupled with the object appearance in screen space, and as such, it depends on the camera position and orientation. There are several factors dictating whether a patch will appear in the atlas, and if so what its dimensions should be. Firstly, a patch is initiated into a shading atlas once it becomes a part of the potentially visible set. This roughly means that the patch is added for the first time once it can be revealed by camera moving near the present location. The initial superblock assignment for the added patch depends on the patch appearance in screen space. The patches, which are closer to the camera, appear bigger in screen space and thus are allocated a larger portion of the atlas real estate. In addition, patches that appear at large incident angles with respect to the camera axis may appear slanted and as such may be represented in an atlas by a patch with high aspect ratio (e.g., a skinny rectangle). Depending on camera motion, the triangle appearance in screen space may gradually change, and consequently the corresponding patch's size and aspect ratio may change too. In instances of shading atlas organization where the column widths are restricted to powers of two, there may be a restricted number of patch sizes and aspect ratios which are available in the atlas, and so the switch of a patch from one column-width superblock to another may not be very frequent or continuous in time.

Furthermore, in order to preserve the aforementioned temporal coherence within the atlas, a patch, once added to the atlas, may be restricted to occupy the same place for as long as possible subject to some constraints. A patch location in a shading atlas may change once: (i) its screen space area and aspect ratio become increasingly inappropriate for the current superblock column width, so the switch becomes necessary, or (ii) the patch ceases to be in the potentially visible set for a prolonged period of time. In both these situations, the patch in question must be moved within the atlas or removed altogether—specifically in case (ii). The change may result in a temporary increase in the encoded bitrate, but the new state may persist a while leading to overall lowering the encoded bitrate. In addition to cases (i) and (ii), there can be additional reasons for patches to change their location within shading atlas. In some implementations, the shading atlas temporal evolution may be interrupted occasionally to introduce atlas reset events. Atlas reset events may be needed in order to keep the memory fragmentation or atlas over-utilization in check. During atlas resets, the patch allocation for all the currently potentially visible patches is re-determined anew which often results in most patches changing their location in the atlas. Certain patches can also be removed from or added to the atlas during atlas reset events. When shading atlas sequence is encoded using IPPP structure common in moving picture experts group (MPEG) family of encoding standards, the atlas reset events may be synchronized with periodic insertion of I-frames, since the disruption of temporal coherence in I-frames does not lead to significant increase in encoded bitrates. In order to facilitate fast memory lookups, both horizontal and vertical patch sizes are kept as powers of two. For instance, a patch may be 16 pixels tall and 64 pixels wide. This patch would be assigned to a superblock containing patches that are all 64 pixels in width. When the headset position changes so that the patch's aspect ratio appears much closer to 1:2, and slightly larger in size, the patch will be removed from its current location, and it may be assigned 32 pixels in heights and 64 pixels in width. In this case, it may again be allocated to a superblock of width 64, but it would need to change its place.

As indicated above, vector streaming transport can also include meta-information, which is sent along with each encoded shading atlas (thus once per server frame). This meta-information may for instance describe the triangle-to-patch assignment (which is transported once upon the beginning of service), or patch-to-superblock assignment and location of the patch within the atlas (both of which may change from frame to frame). The client can use the meta-information to determine how to map the surfaces in the shading atlas to the visible mesh triangles projected in the screen space during the rasterization step performed on the client. In some aspects, two different eye buffers can be formed by the client using the shading atlas, the mesh geometry, the meta-information, and the most recent client pose.

In some aspects, shading information can be sent from a server to a client device using the shading atlas. The shading atlas can also be video encoded. In some instances, even though the encoded shading atlas may conform to a standard moving picture experts group (MPEG) based stream, at least some of the properties of the encoded bit stream and/or some information included in the shading atlas can be unique. For instance, the encoded video stream may contain multiple slices, which may be chosen such that each slice contains full (and not partial) superblocks. This is always possible if the atlas is partitioned into an integer number of superblocks, and all superblocks are of the same size. Moreover, the shading atlas stream may occasionally be corrupted by the transmission media, interference, or other causes. The corruption in the video stream may be such that it results in a decodable video, but such where certain portions of certain frames cannot be decoded properly or may otherwise appear corrupted upon decoding.

In some instances, the screen space can include a number of different surfaces, such as surfaces that occlude other surfaces in the screen. Therefore, the shading atlas and the meta-information can help to explain these different surfaces, their shape, size, and appearance on the screen, e.g., the information that a client device may need to render the scene in a correct manner.

Figure 3:
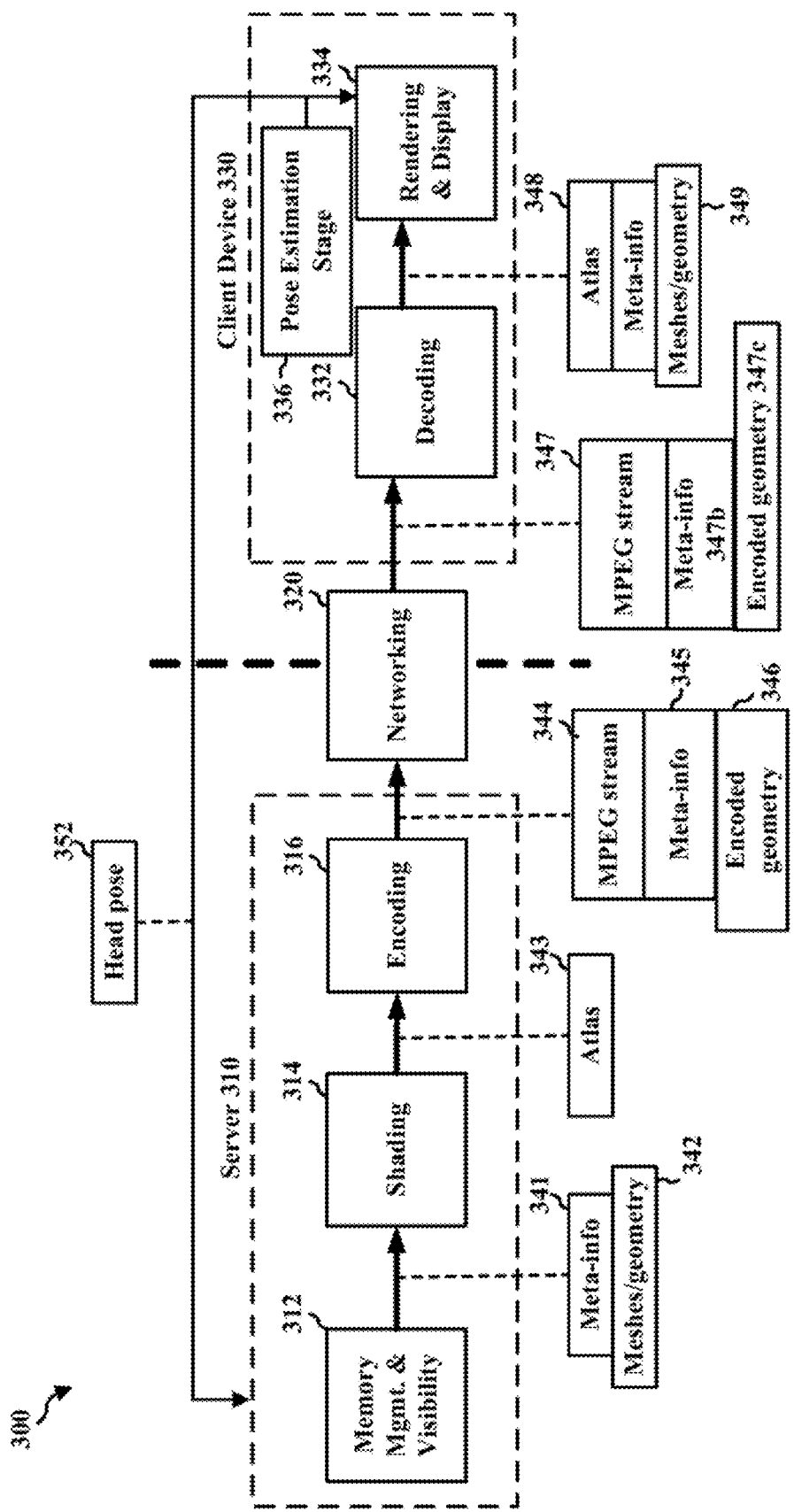
FIG. 3 illustrates an example diagram including communication between a client device and a server in accordance with one or more techniques of this disclosure.

Referring to FIG. 3, and continuing to refer to prior figures for context, an example architecture 300 for split rendering between a server 310 and a client device 330 is shown, in accordance with one or more techniques of this disclosure. More specifically, architecture 300 illustrates a vector streaming transport system including the information transfer protocol between server 310 and client device 330. Diagram 300 includes server 310, networking 320, and client device 330. As shown in FIG. 3, the server 310 includes visibility and memory management stage 312, shading stage 314, and encoding stage 316. The client device 330 can include decoding stage 332, display stage 334, and pose estimation stage 336.

As shown in FIG. 3, meta-information 341 can be determined following the memory management process in stage 312. The visibility process in stage 312 may determine the relevant geometry and/or mesh data 342 that will be sent to the client device 330 in the current frame. The shading atlas 343 is a result of the shading stage 314 and is encoded for transport over the network 320 to the client device 330 in the encoding stage 316. The encoding stage 316 may be responsible for encoding the series of shading atlas frames 343 into an MPEG stream 344. The encoding stage may also be responsible for compressing and forward-error-correcting the meta-information 345 and/or the geometry/mesh data 346. MPEG stream 344, meta-information 345, and encoded geometry 346 can be transported from the server 310 to the client device 330 via the network 320. In some instances, the MPEG stream 344 may be corrupted in network 320, and thus the received MPEG stream 347 may not exactly correspond to the transmitted MPEG stream 344. In addition, in some instances, the meta-information and the encoded geometry may be more resilient to the transport medium, or they may be sent via protocols that are more reliable so that the client receives them uncorrupted. The client decodes the received streams in the decoding stage 332. The meta-information and the geometry and/or mesh data reconstructed after the decoding stage 332 may in some instances exactly match the corresponding data on the server 310, e.g., meta-information 341 and geometry and/or mesh data 342. However, if the MPEG stream was somehow corrupted, the reconstructed shading atlas frames 348 may not match the shading atlas frames 343 prepared on the server 310. After decoding, shading atlas frames 348 and decoded meta-information 350 as well as the decoded geometry/mesh data 349 can be used by the rendering and display stage 334 along with the most recent pose information 352 in order to render the left and right eye buffers and display them on a screen (not shown in FIG. 3) at the client device 330.

As indicated above, the shading atlas MPEG stream may be subject to lossy transmission where some information packets may experience errors, such as being dropped, corrupted during transport, or not accurately decoded. In some instances, the lost information packets may translate to reconstructed atlas frames that are partially inaccurate. Unless the affected information packets carried some critical information (e.g., the system header), the effect of random occasional packet loss may be more space/time limited. For instance, one lost real-time transport protocol (RTP) packet in a stream may affect one MPEG slice if slices are organized such that no RTP packet spans more than one slice. This in turn means that a corrupted or dropped RTP packet may result in several superblocks of the incoming atlas being decoded incorrectly.

In some aspects, video transport systems can offer some level of resilience to network behavior, such as sporadic packet loss and/or sporadically increased delays over the network. Some video transport systems, e.g., streaming video systems, can rely on buffering and stock error concealment. However, buffering may not be an option for latency sensitive content, such as split rendering architecture, e.g., cloud gaming, split XR, split AR, or split VR, where a good portion of the rendering operations are performed remotely on the server, i.e., away from the pose estimation stage 336 and where it is desirable to keep end-to-end system latency low. Also, stock error concealment implemented by some video decoders may work for errors in certain types of video encoding macroblocks (MBs), e.g., intra-coding MBs (I-MBs), inter-coding MBs, or predictive-coding MBs (P-MBs), where successfully decoded content from previous frames or neighboring macroblocks of the current frame can be used to conceal any current error. However, such techniques were developed specifically for natural video data abundant in spatial coherence, and it usually does not work well with computer graphics content in general and even more so with shading atlas content with little or no spatial correlation.

In some aspects, the video streamed in vector streaming transport systems can have different properties compared to other systems. For instance, unlike natural video or pixel streaming graphics content, regions in a vector streaming shading atlas correspond to garbled object-space appearance, rather than screen-space appearance. Due at least in part to this, two neighboring macroblocks may be very different in appearance, especially if the neighboring macroblocks align with two (or more) different vector streaming blocks. Moreover, since the patches that make up the superblocks and the atlas itself always correspond to the same physical surfaces in object space, and they contain a unique patch identifier, the frame-to-frame content correspondences can be easier to determine. In particular, snapshots of a patch with a given identifier can be much more correlated across time-spaced frames than is the case with the appearance of that patch and the neighboring patches in any given one frame. Due to a specific nature of video content, there is a present need for video transport in vector streaming to include a separate or specialized error concealment algorithm.

Aspects of the present disclosure can include a specialized error concealment algorithm for vector streaming systems. For instance, a vector streaming system can stream information regarding how patches from one shading atlas correspond to patches from another shading atlas. This can make it possible for the present disclosure to determine on the patch-level whether a corresponding patch was received in a previous information transfer. In some instances, a missing patch in a current shading atlas may include a number of pixels, e.g., N pixels, and a corresponding patch from a previous successfully-decoded shading atlas may be represented using another number of pixels, e.g., M pixels, where M can be smaller or larger than N. The information about patch size in each atlas frame also is available and may be used by the client device 330 for atlas-space error concealment.

As indicated above, each patch comes accompanied with information describing where it is located in this frame's shading atlas. In addition, previous patch location information of missing patches can be stored for corresponding patch instances received in previous frames. Accordingly, a version of a patch missing from the current shading atlas can be retrieved from previous shading atlases.

In some aspects of the present disclosure, missing patches, e.g., dropped or otherwise not properly decoded patches, may be found to have been correctly received and decoded in one of the previous shading atlases. Also, the corresponding meta-information can be assumed to be available/unchanged or reliably received at the client side. In addition, while this information can typically be streamed at a higher reliability, the technology of the present disclosure can also include an algorithm to circumvent occasional losses of meta-information. A vector streaming client device can use this information to locate a recent copy of the presently missing patch, which can describe the same physical surface in object space as a previous, correctly decoded, patch. Also, a vector streaming client can update its other inner state parameters to make the occasions of patch-level concealment transparent to the client renderer. For instance, if a patch was not decoded correctly in this frame, the corresponding pointers may be modified to point to a recent copy of the same patch, or the latest draw buffer may be generated using a combination of the latest decoded texture and pieces of the previously decoded textures. In this way, the rendering operation remains agnostic to the fact that error concealment took place.

As indicated above, when a scene is being rendered on a client device, geometry information and patch information (e.g., meta-information) are needed. The rendering unit rasterizes geometry and texture-maps the shaded surfaces of those meshes using the patch representation portrayed in shading atlas. The current patch representation can be obtained from the most recent decoded frame of the shading atlas video stream, or—in case of transmission errors—from a previous frame, referencing a previous instance of the received patch. In addition, the latest version of a correctly decoded patch can be stored in memory, e.g., internal memory. Therefore, when a patch is correctly received, the patch can be stored and the client may maintain the most recent correct rendition of the patch. This memory storage can be retained for a certain period of time, e.g., 1 second, which may be determined by the maximum available storage on the client device.

Additionally, if there is an error for a received patch in the current frame, the present disclosure can determine if the patch representation is correctly stored elsewhere in the memory. Therefore, aspects of the present disclosure can utilize accurately received prior patch information for current rendering. Alternatively, if a patch corresponding to the latest frame update is missing or inaccurate, then the prior successfully decoded version of the missing/inaccurate patch can be retrieved. Moreover, the system parameters can be updated to indicate that the stored previous patch representation is used for rendering the next frame, as opposed to the missing or incorrectly decoded present patch representation.

In some instances, representation of patches in the shading atlas can change in size or aspect ratio over time. For instance, the surfaces in the shading atlas correspond to specific surfaces on a mesh of the object, specifically the portions of the mesh potentially visible from the viewpoint at the time of rendering. Depending on the camera view, a patch representation describing a small portion of a mesh may change in time to appear to be of a different shape or size when seen in projective space. Also, the aspect ratio can be stretched depending on the camera view. In some aspects, the client device can know about the current size and aspect ratio requirement for all patches from the meta-information, and if a patch is missing or decoded incorrectly in the current atlas, the client device can utilize previously received correctly-decoded instances of the patch and re-shape those instances to fit the current block size and aspect ratio.

As indicated above, some aspects of the present disclosure can determine if a patch is accurately decoded from a current shading atlas. If the patch is accurately decoded, the present disclosure can maintain the patch representation and inform the client renderer to proceed with rendering. If the patch is not accurately decoded, examples of the technology disclosed herein can determine if the patch was represented in a recently accurately decoded shading atlas. If the patch was represented in a recently-stored successfully decoded shading atlas, or was stored separately, the present disclosure can use this previous patch representation to represent the patch in the current shading atlas. Aspects of the present disclosure can also update the system parameters in order for the client renderer to proceed rendering without any delays.

If a patch was not accurately decoded previously and available in client memory, examples of the technology disclosed herein can utilize other methods, e.g., video in-painting methods. This may be the case with previously unseen content, for instance, if a patch appears in the potentially visible set for the first time since the start of rendering, yet it is the first-transmitted representation in a shading atlas was not received or decoded accurately. Additionally, examples of the technology disclosed herein may include a number of different features aimed at using the error-concealed patches to prevent the error propagation in the decoded video content. The error concealment directly affects the rendering part of the client. However, the video decoder part may also benefit from correcting the corrupt information. Since the video decoder depends on its previous state when decoding all inter-coded/predictive-encoded macroblocks, a corrupt patch in one decoded atlas will typically propagate the error in the consequent frames until the corresponding macroblocks (MBs) are intra-encoded (for instance, in an I-frame). This is one reason that the error concealment information may also be propagated to the state of the decoder, in order to rectify the information that may be used when decoding future predictive-encoded macroblocks.

As indicated herein, if a patch is received accurately or correctly, then the client device can render the patch as-is. In addition, the accurately/correctly decoded patch, and in some cases the patch's meta-information, can be stored, e.g., in memory, for use at a later time. If a patch is not received accurately or correctly, the present disclosure can determine the last received atlas that includes this block and where the patch is located in the shading atlas. Alternatively, the client may store each successfully decoded instance of a patch separately—not within an entire shading atlas. If the patches are stored separately, then the client may consult a patch storage table to determine: (i) whether the patch was successfully received in the past, (ii) if so, where it was stored, and (iii) what are the patch's dimensions in the previous successful depiction. The previously correctly-decoded patch can then be retrieved on an individual basis using the most recently-decoded instance of the same patch, and consulting the storage table to determine its location in memory.

There may be advantages to storing individual patch representation versus storing entire shading atlases. For instance, any given correctly-decoded shading atlas contains a subset of all the patches associated with a scene. Thus, in order to maintain at least one correct instance of each patch ever received, the client may need to store a very large number of shading atlases with many duplicated patch representations. In contrast, if the patches are stored individually, the client may retain the most recent correct representation of the particular patch, allowing the other representations to be over-written or otherwise controlled by the garbage collection function of the client device operating system.

Furthermore, as the location of each patch may vary from frame to frame, finding the most recent atlas that contains a patch, and then finding where the patch is stored in the atlas may require sifting through a number of meta-information messages, which describe the patch-to-atlas location mapping. In the examples where each patch is retained individually, the client device can update the patch storage table when a new representation of a patch has been successfully decoded and stored, which then simplifies the lookup process in time of error concealment.

On the other hand, there can be certain advantages of storing on the client the compact atlas representations instead of individual patches. For instance, the shading atlas representations have a benefit of already having undergone tight memory management scheme on the server, which promotes a rather tight memory footprint for each individual atlas. If only a small number of shading atlases are retained in the memory (five to ten, for instance), which may be consecutive atlases or atlases separated by K instances: e.g., atlas number L, atlas number L+K, atlas number L+2K, etc., where K may be a small integer larger than one, then the required total memory footprint on the client may be rather moderate. As opposed to this, if storing individual patch is pursued instead, the client device needs to maintain the memory management that can require extra compute resources and could lead to larger memory footprints if not managed timely or properly. Examples of the technology disclosed herein describe the mechanisms of patch-level error concealment when either strategy is used and the selection of the appropriate strategy may depend on specific client architecture and requirements.

In some aspects of error concealment in vector streaming, examples of the technology disclosed herein can determine how a vector streaming client device may react in the case of packet losses. In some instances, I-frames can be inserted in regular intervals, e.g., every five frames, to stop error propagation. In addition, each shading atlas reset event may result in inserting a new I-frame in order to efficiently encode the radical changes in the patch locations within the atlas. In some aspects, messages and other meta-information can be transported error-free, e.g., on a transmission control protocol (TCP) link, or with various levels of reliability as made possible by reliable user datagram protocol (RUDP).

Additionally, aspects of the present disclosure can also include a number of current video encoder settings. For instance, an atlas frame can be divided into horizontal bands, i.e., video slices. In addition, losing a network packet from the video bit-stream may result in corrupting the entire slice, e.g., an encoded bit-stream corresponding to the slice may be non-decodable. Further, a video decoder can apply decoder error concealment. For an I-frame, the slice can be filled with a constant color, such that no reference frame may be used for concealment. For macroblocks in a P-frame, or predictive-encoded macroblocks, the video decoder can propagate the last correctly decoded reference macroblock, e.g., along the best known or extrapolated motion vectors.

Aspects of the present disclosure can include a number of structures for shading atlas slices. As indicated above, atlas filling can be in vertical direction in order to have all the horizontal slices in a frame contain roughly the same amount of "occupied" content. Aspects of the present disclosure can align video slice boundaries with atlas superblock boundaries whenever possible. Moreover, encoded packets may also be aligned so that a single packet never describes more than one video slice. This can be done to minimize the number of atlas patches affected by a packet loss. In addition, when a slice is lost, a client renderer may attempt to conceal all of the included patches. In some instances, a client can store at least the last correctly decoded atlas to be used for error concealment. In this scenario, a client must gather all the meta-information describing the affected patch evolution between the previous and the current atlas. A client device may also store more than one correctly decoded atlas from the recent past in order to increase the likelihood that a patch affected by the current missing slice was received and stored correctly. Finally, a client may store a group of all previously received and correctly decoded patch that may or may not be arranged in a contiguous memory. A client device may update the block every time a new version of the patch is successfully decoded. A separate table may be maintained in order to specify the patch identifier, the memory location, and size/dimensions of its most recent representation, sometimes referred to as a patch storage table. This information may be sufficient in order to perform error concealment of the effected patch in the current frame.

In some aspects, in order extrapolate representation of patch that were never correctly received, examples of the technology disclosed herein can fill missing triangles in rendered eye buffers using an average value of all the neighboring correctly-received triangles. Further, if a majority of the slice effected by packet loss in the current frame has been received properly in one of the recent frames, then ATW error concealment from the last correctly rendered frame may be used instead of color-average in-painting.

In some instances, the term frame may denote what is rendered by the client, as well as denote what is rendered on the server and sent to the client, as in a shading atlas. Additionally, the frames rendered by the client may be referred to as eye buffers (EBs)—e.g., one for each eye in an XR display. For example, this can be what is expected at the client display in XR applications of a split rendering architecture. The term frame may also refer to the product of server rendering, e.g., a result of consuming one head pose in a game engine rendering pipeline. Frame can also refer to the totality of information received by the client (e.g., over the network) as a result of the server rendering and otherwise processing a head pose. In some instances, the rate of generating server frames may be lower than the rate of generating eye buffers on the client. For example, server frames may be generated at 20 Hz and client eye buffers may be generated at 60 Hz or 90 Hz depending on the HMD display. Thus, multiple EB pairs may be generated for each one frame sent by the server. Moreover, each of these EB pairs may utilize a different head-pose, e.g., as the HMD moves around in-between consecutive updates from the server.

Figure 4:
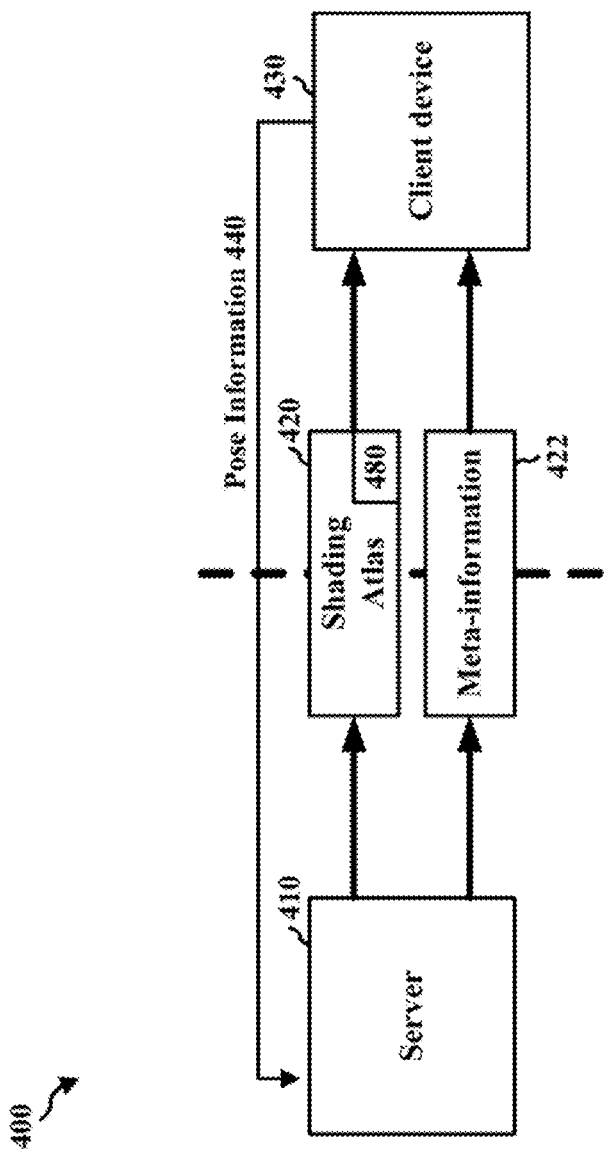
FIG. 4 illustrates an example diagram including communication between a client device and a server in accordance with one or more techniques of this disclosure.

Referring to FIG. 4, and continuing to refer to prior figures for context, diagram 400 illustrates communication between a server 410 and a client device 430, in accordance with one or more techniques of this disclosure. More specifically, diagram 400 is a vector streaming process including information transfer between server 410 and client device 430. As shown in FIG. 4, diagram 400 includes server 410, shading atlas 420 including at least one patch 480, meta-information 422, and client device 430. In some aspects, the server 410 can include a game engine and/or video and audio encoders. In addition, client device 430 can include a headset, an HMD, other multimedia user device equipped with at least one display, and/or video and audio decoders.

FIG. 4 illustrates an example of the aforementioned processes of a split rendering system. For instance, aspects of the present disclosure, e.g., servers and client devices herein, can perform error concealment during vector streaming. For example, client devices herein, e.g., client device 430 in FIG. 4, may receive at least one shading atlas, e.g., shading atlas 420, including one or more patches. Client devices herein can also decode the at least one shading atlas, e.g., shading atlas 420, including the one or more patches 480. Further, client device 430 can return pose information 440 to the server 410 for use by the server 410 in preparing the next frame.

Additionally, client devices herein can determine whether at least one patch of the one or more patches, e.g., a patch in shading atlas 420, is accurately decoded, where the at least one patch can include information shaded on the server, e.g., using a recent game state and a head pose. Client devices herein can also render a portion of a frame based on the patch when the at least one patch, e.g., a patch in shading atlas 420, is accurately decoded. In some aspects, the portion of the frame can be rendered based on display content of the at least one patch, e.g., a patch in shading atlas 420. Moreover, client devices herein can store patch representation for at least one patch when the at least one patch, e.g., patch 480 in shading atlas 420, is accurately decoded. In some instances, client devices herein can also store the decoded at least one shading atlas, e.g., shading atlas 420, including the one or more patches when the at least one shading atlas is accurately decoded. If shading atlases are being stored, some client implementations described herein would also store meta-information (block information) corresponding to all stored shading atlases Client devices herein can also identify a previous version of the at least one patch when the at least one patch, e.g., patch 480 in shading atlas 420, is not accurately decoded, e.g., in the current server update or frame. In some aspects, the previous patch can be further identified based on the affected patch 480 unique identifier, cumulative meta-information, e.g., meta-information 422, received by the client between the last correctly-decoded instance of patch 480 and the present time, and the shading atlas containing the previous correctly-decoded representation of patch 480. Alternatively, the previous pixel information of patch 480 can be read from the last accurately decoded instance of the patch 480 stored at the client and the patch storage table that maintains the memory address of this storage.

In addition, client devices herein can conceal the error of at least one corrupted patch based on the previous version of the at least one patch. In addition, client devices herein can render a portion of a frame based on the error-concealed patch or the at least one corrupted patch when the at least one patch, e.g., patch 480 in shading atlas 420, is not accurately decoded.

In some aspects, the at least one shading atlas, e.g., shading atlas 420, including the one or more patch can be received from a server, an edge server, or a cloud server, e.g., server 410. Also, the at least one shading atlas, e.g., shading atlas 420, including the one or more patch can be received by a client device, a headset, or a head mounted display (HMD), or any other multimedia device with at least one display, e.g., client device 430. In some instances, the determination whether the at least one patch of the one or more patch, e.g., a patch in shading atlas 420, is accurately decoded can be at least partially performed by a GPU, a CPU, or a dedicated hardware decoder. If a patch is accurately decoded, the client can use it to render the current frame. It can also be stored by the client to replace the previous accurately decoded instance of the patch in question. Conversely, if the patch was not accurately decoded in the current frame, the client may use a lookup table to identify if the corrupted patch has been previously accurately decoded and stored by the client, may use another cataloging method to identify where such previous instance of the patch is stored in the client memory, and may use the cumulative meta-information to determine the previous dimensions of the patch and/or how that previous patch should be mapped to conceal the current instance of the patch which was not accurately decoded. Alternatively, the previous dimensions of the patch may also be stored on the client in the cataloging method, i.e., in a lookup table, hash table, etc. Moreover, when an entire slice of shading atlas, containing multiple currently missing patches, i.e., inaccurately decoded patches, has been successfully error-concealed using the previous patch instances from the client's memory, this pixel information may then be propagated on the client into the video decoder inner memory and used to replace/modify the corresponding video macroblocks (MBs) that could not be correctly decoded in the present frame. This approach error-conceals the entire slice (comprising patches), and then the error-concealed slice is used to modify each individual MB within the slice. The at least one shading atlas, e.g., shading atlas 420, including the one or more patches can be received for an XR application, an AR application, VR application, or any other split rendering multimedia application.

Some aspects of the present disclosure can (1) receive and decode a shading atlas. Then, for each patch in the decoded atlas, the present disclosure can (2) determine if the patch is (a) accurately decoded or (b) corrupted. If (2a), the present disclosure can: (i) save a current patch representation and patch meta-information appropriate for locating the correctly decoded patch (such as a patch identifier), and/or over-write the previous instance of the same patch, (ii) use this previous instance of the same patch on a client to render the next frame. If (2b), the present disclosure can determine whether the previous instance of the corrupted patch has been saved on client. If so, the present disclosure can determine appropriate previous instance of the patch in order to error-conceal the corrupted/missing patch using previously stored patch. Previous instances of correctly decoded patches can be retrieved from client memory using the patch location information, which may be maintained by the client (typically used when the client stores individual patch representations directly in memory), or retrieved by the client using the stored meta-information (typically used when the client stores entire past shading atlases). The present disclosure can also use this error-concealed version of the patch for client rendering. In addition, the present disclosure can propagate the error-concealed pixel content to the video decoder which can then be used as a prior state replacing the corrupted/missing prior state information. If the previous correctly decoded instance of a corrupted patch was not saved, then the present disclosure can determine pixel information by one of several techniques: in-painting for the patch pixel information, error concealment in screen space, post-client rendering using previously-rendered frames and the knowledge about the affected area in screen-space using the corrupted patch's identifier, constituent triangle identifiers, corresponding vertex information, and/or the latest camera pose used for client rendering. However, if the patch is error-concealed, the present disclosure can use that version for client rendering, except when the error concealment may not be applied to corrupted patches but rather to the rendered frame directly.

Figure 5:
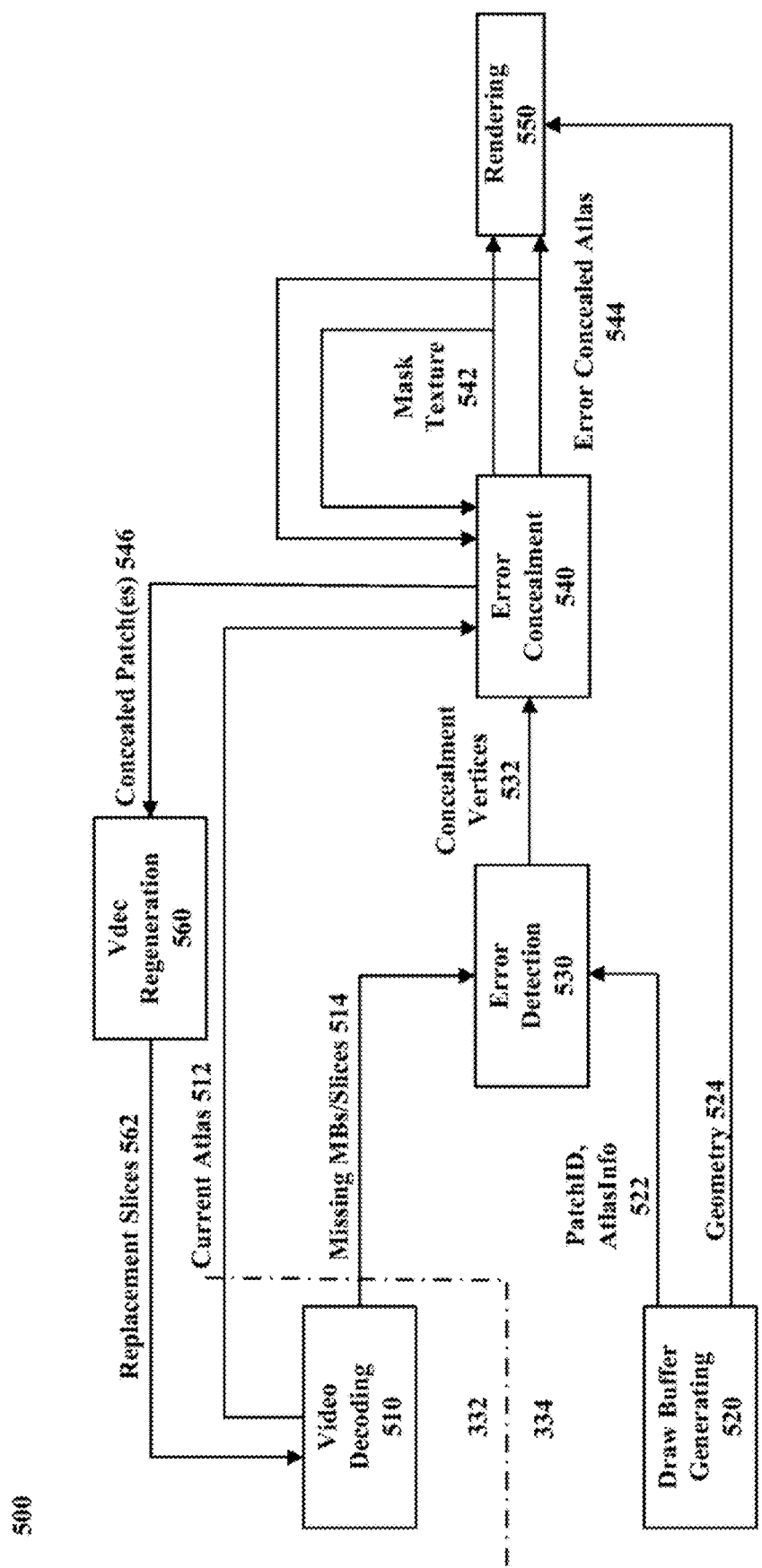
FIG. 5 illustrates an example architecture for atlas error concealment at a client device in split rendering graphics processing, in accordance with one or more techniques of this disclosure.

Referring to FIG. 5, and continuing to refer to prior figures for context, an example architecture 500 for atlas error concealment at a client device in split rendering graphics processing is illustrated, in accordance with one or more techniques of this disclosure. In such an architecture 500, a video decoding 510 stage (for example, as part of decoding stage 332 described above in conjunction with FIG. 3) outputs both i) a decoded current atlas 512 and ii) a list of missing/unsuccessfully decoded portions of the current atlas, e.g., missing MBs/slices 514. Both current decoded atlas 512 and missing MBs/slices 514 are typical outputs of many video decoder units. Note that MBs and slices are video encoding units, and not units intrinsic to shading atlas.

A draw buffer generating 520 stage outputs not only the geometry 524 (vertices, triangles, attributes) information to support a rendering 550 stage, but also a list of originating patches and corresponding atlas locations thereof as {PatchID, AtlasInfo} 522. For example, draw buffer generating 520 stage can be part of the overall rendering and display stage 334 described above in conjunction with FIG. 3, using the received encoded meta-info 347b and encoded geometry 347c of FIG. 3. In some examples, single-color patches are not sent in the shading atlas, and are not included in the {PatchID, AtlasInfo} 522.

Error detection 530 stage can use the missing MB/slices 514 and the {PatchID, AtlasInfo} 522 to determine which patches in the current atlas 512 intersect with the missing MBs/slices 514, passing that information as concealment vertices 532 (e.g., texture coordinates) to an error concealment 540 stage. In some examples, the error detection stage 530 stores the last frame number where a PatchID was updated and the AtlasInfo was valid.

Error concealment 540 stage uses i) the error concealed atlas 544 information of the previous frame, ii) the concealment vertices 532 information of the current frame, iii) the current atlas 512, and iv) the error concealed atlas 544 of the previous stage to replace some patches of the current atlas 512 with corresponding valid patches of the error concealed atlas 544 information of the previous frame. In addition, where the error concealed atlas 544 information of the previous frame does not contain a corresponding valid patch, the error concealment 540 stage uses a mask texture 542 to indicate portions of the screen that need to be in-painted during the rendering 550 stage before display. As noted above, the current error concealed atlas 544 is saved as an input to error concealment 540 for the next frame.

The rendering 550 stage renders the screen space representation of the frame (e.g., left and right eye buffers) based on the error concealed atlas 544 (which also contains texture information for valid atlas patches that did not require concealment) and the geometry 524. For areas indicated in the mask texture 542 as lacking valid prior frame concealment texture, the rendering 550 stage can use in-painting or some other form of concealment. This approach prioritizes the use of the textures of prior valid patches over in-painting and other methods of concealment.

Figure 6:
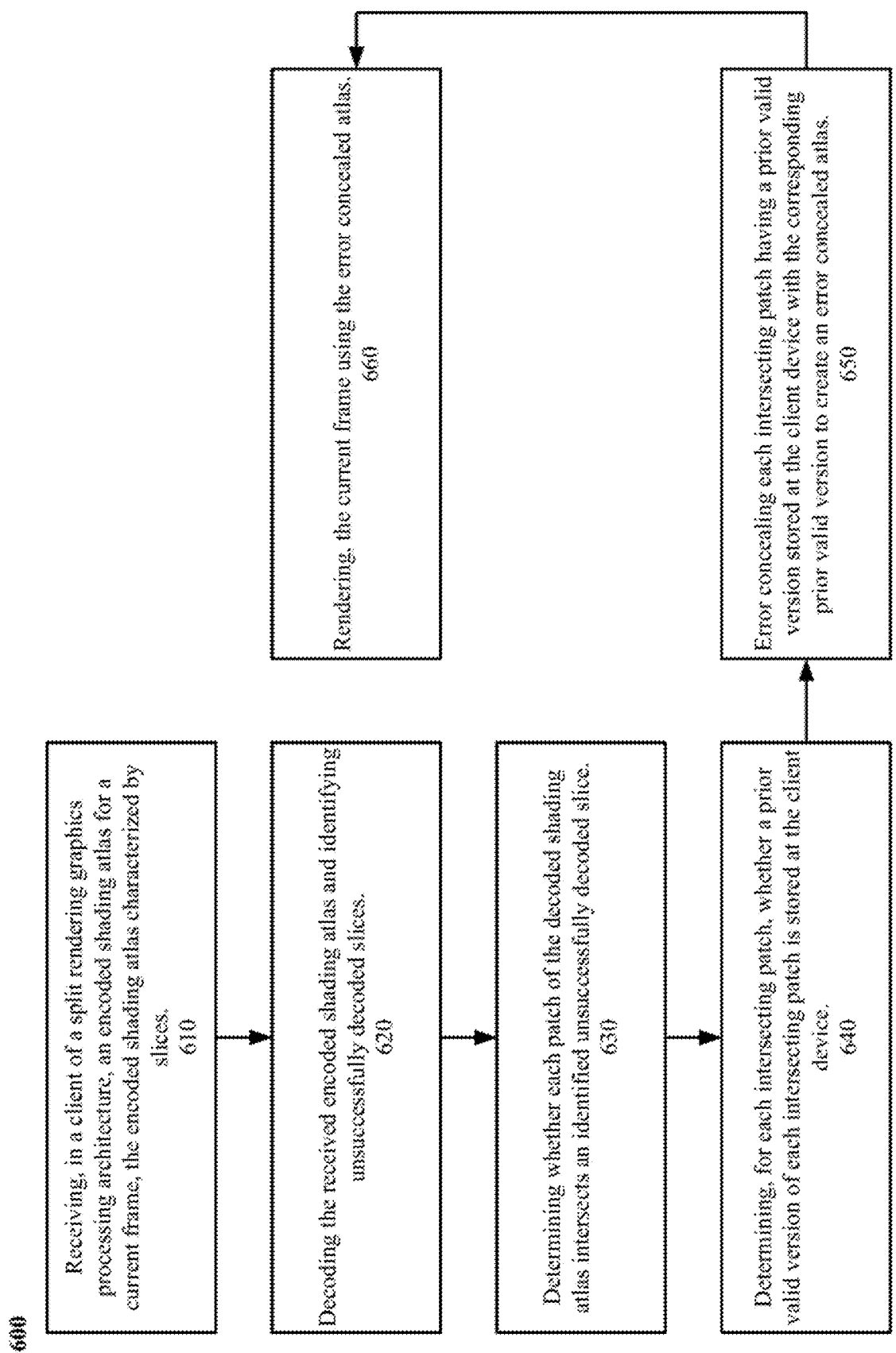
FIG. 6 is a flowchart of an example method of graphics processing, in accordance with one or more techniques of this disclosure.

Referring to FIG. 6, and continuing to refer to prior figures for context, a flowchart 600 of an example method is illustrated, in accordance with one or more techniques of this disclosure. The method may be performed by an apparatus such as one or more of a client device, a CPU, a GPU, or an apparatus for graphics and/or video processing.

In such methods, a client device of a split rendering architecture receives an encoded shading atlas for a current frame—Block 610. The encoded shading atlas can be characterized by slices. In a continuing example referring to FIG. 3 and FIG. 5, the encoding stage 316 of server 310 encoded a series of shading atlases 343 into an MPEG stream 344. The encoding stage 316 also compressed and forward-error-corrected the meta-information 341 (which includes {PatchID, AtlasInfo} discussed above) and the geometry/mesh data 342. MPEG stream 344, encoded meta-information 345, and encoded geometry 346 were each transmitted by the server 310 over network 320. The transmissions are received by the client device 330 from server 310 after potentially being transformed, corrupted, and possibly dropped, by the network 320.

In such methods, the client decodes the received encoded shading atlas and identifies unsuccessfully decoded slices—Block 620. In the continuing example, video decoding 510 stage decodes the received MPEG stream (for example as part of decoding stage 332), and outputs the decoded current atlas 512. The shading atlas MPEG stream 344 is subject to lossy transmission and some portion of the stream may experience errors. For example, the MPEG stream 344 may be corrupted in network 320, and thus the received MPEG stream 347 may not exactly correspond to the transmitted MPEG stream 344. Video decoding 510 stage outputs a list of those portions of the stream, i.e., slices in the continuing example, identified as unsuccessfully decoded (missing MBs/slices 514).

The client device determines whether each patch of the decoded shading atlas intersects an identified unsuccessfully decoded slice—Block 630. In the continuing example, the client device has also received encoded geometry 347b of the current frame and encoded meta information 347c of the current frame—each of which can be encoded together, or separately. Each of encoded geometry 347b and encoded meta info 347c can be encoded in a manner other than the encoding of the shading atlas 343—as is the case in the continuing example. With regard to the shading atlas 343, the meta information 345 includes a list/updates of {PatchId, AtlasInfo}522 that maps patches to locations in the current atlas 512. The additional information also maps the mesh vertices to texture vertices via the patch layout. In the continuing example, the draw buffer generating 520 stage extracts {PatchID, AtlasInfo} for patches/updated patches that are potentially visible in the current frame from the encoded meta information 347c.

In the continuing example, error detection 530 stage uses the {PatchID, AtlasInfo} 512 and the missing MBs/slices 514 to identify each patch that intersects an unsuccessfully decoded slice. The list of such patches intersecting an unsuccessfully decoded slice is used together with the PatchID and AtlasInfo to output concealment vertices 532 information.

The client device determines, for each intersecting patch, whether a prior valid version of the intersecting patch is stored at the client device—Block 640. In the continuing example, error concealment 540 examines the prior error concealed atlas 544 (saved from processing the prior frame) to determine if a valid counterpart to each patch identified as to be concealed in the concealment vertices 532 information is available.

The client device error conceals each intersecting patch having a prior valid version stored at the client device with the corresponding prior valid version to create an error concealed atlas—Block 650. In the continuing example, the error concealment 540 stage uses i) the error concealed atlas 544 of the previous frame, ii) the concealment vertices 532 of the current frame, and iii) the current atlas 512 to replace erroneous patches of the current atlas 512 with corresponding valid patches of the error concealed atlas 544 of a previous frame (in some examples, the immediately previous frame)—creating the error concealed atlas 544 of the current frame. In the continuing example, the error concealed atlas 544 is a set of textures including textures of properly decoded sections of the current shading atlas 512 and error concealed textures of the current shading atlas.

The client then renders the current frame using the textures of the error-concealed atlas—Block 660. In the continuing example, the rendering 550 stage is agnostic with respect to the source of the surfaces in the error concealed atlas 544.

Figure 7:
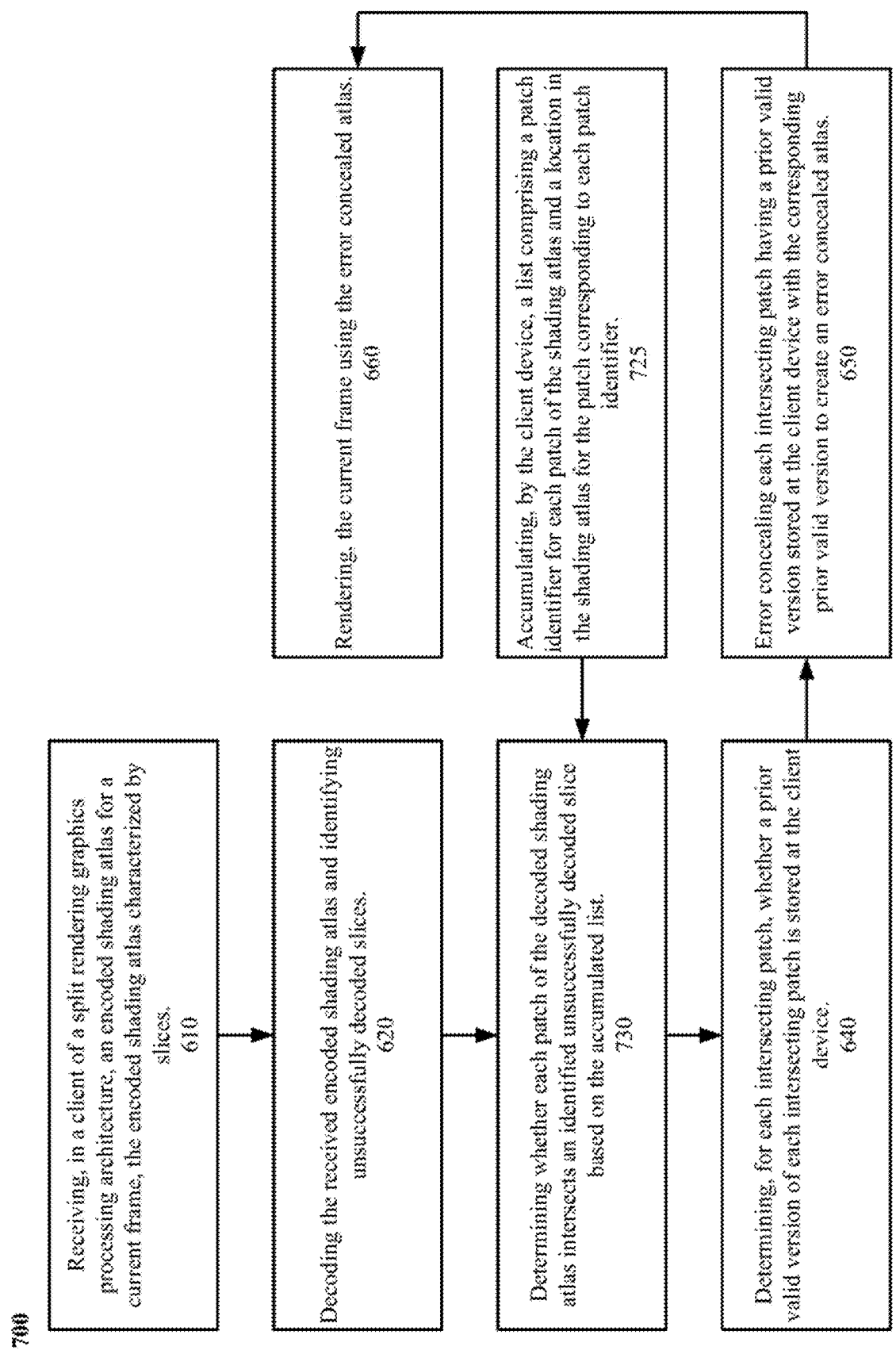
FIG. 7 is a flowchart of an example method of graphics processing, in accordance with one or more techniques of this disclosure.

Referring to FIG. 7, and continuing to refer to prior figures for context, a flowchart 700 of an example method is illustrated, in accordance with one or more techniques of this disclosure. The method may be performed by an apparatus such as one or more of a client device, a CPU, a GPU, or an apparatus for graphics and/or video processing. In such methods 700, Block 610, Block 620, Block 640, Block 650, and Block 660 are performed as described above in connection with FIG. 6.

In such methods 700, the client device 330 accumulates a list comprising a patch identifier for each patch of the shading atlas and a location in the shading atlas for the patch corresponding to each patch identifier—Block 725. In the continuing example, the draw buffer generating 520 stage of the client device 330 may receive a complete new set of {PatchID, AtlasInfo} from the server 310 only occasionally, and receives updates to the list between complete new sets. In such methods 700, determining whether each patch of the decoded shading atlas intersects an identified unsuccessfully decoded slice based on the accumulated list—Block 730.

Figure 8:
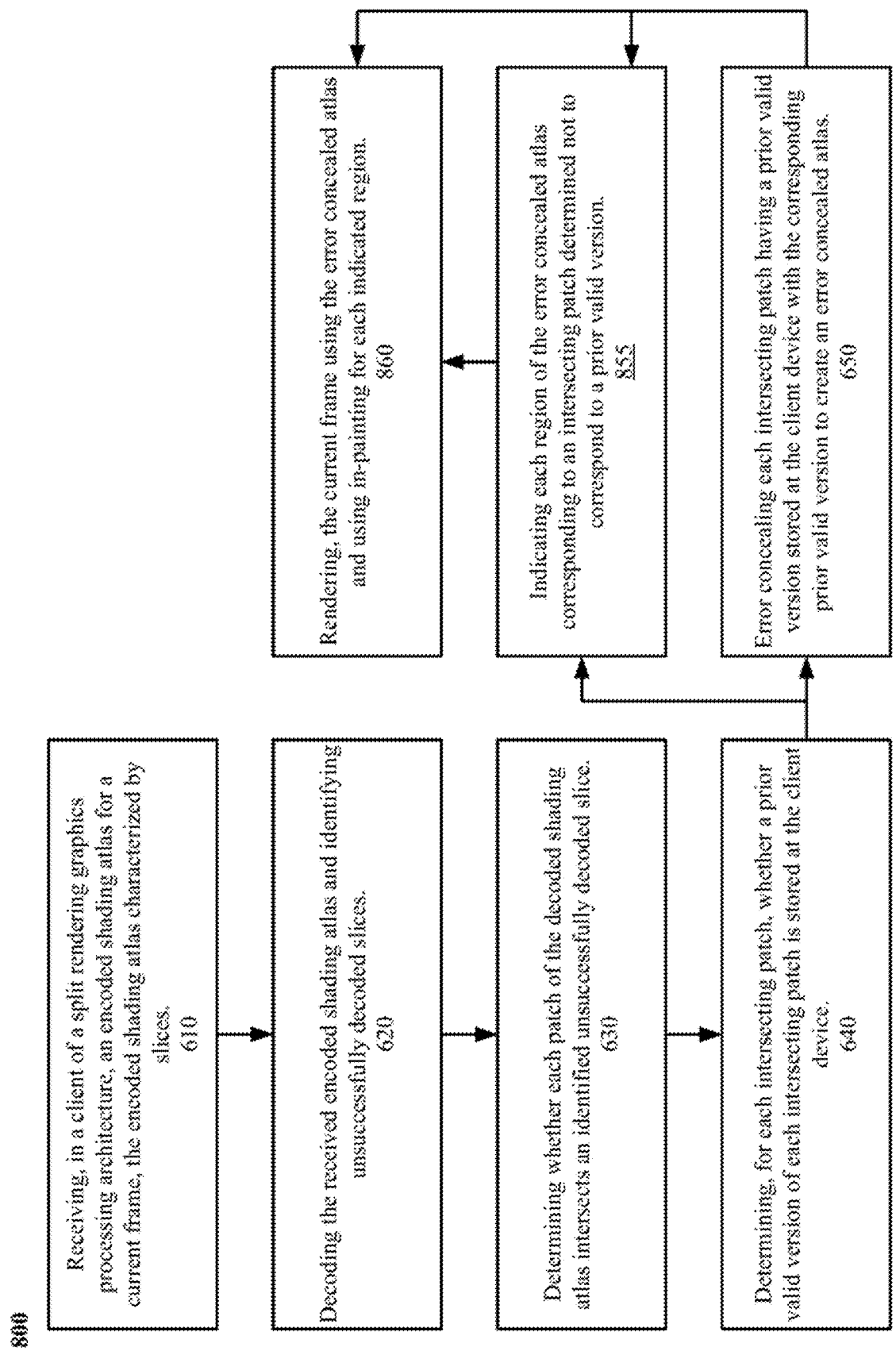
FIG. 8 is a flowchart of an example method of graphics processing, in accordance with one or more techniques of this disclosure.

Referring to FIG. 8, and continuing to refer to prior figures for context, a flowchart 800 of an example method is illustrated, in accordance with one or more techniques of this disclosure. The method may be performed by an apparatus such as one or more of a client device, a CPU, a GPU, or an apparatus for graphics and/or video processing. In such methods, Block 610-Block 650 are performed as described above in connection with FIG. 6.

In such methods 800, the client device indicates each region of the error concealed atlas corresponding to an intersecting patch determined not to correspond to a prior valid version—Block 855. In the continuing example, the error concealment 540 stage uses mask texture 542 to indicate each region of the error concealed atlas corresponding to an intersecting patch determined not to correspond to a prior valid version. In such methods, the client device renders the current frame using the error concealed atlas and using in-painting for each indicated region—Block 860.

Figure 9:
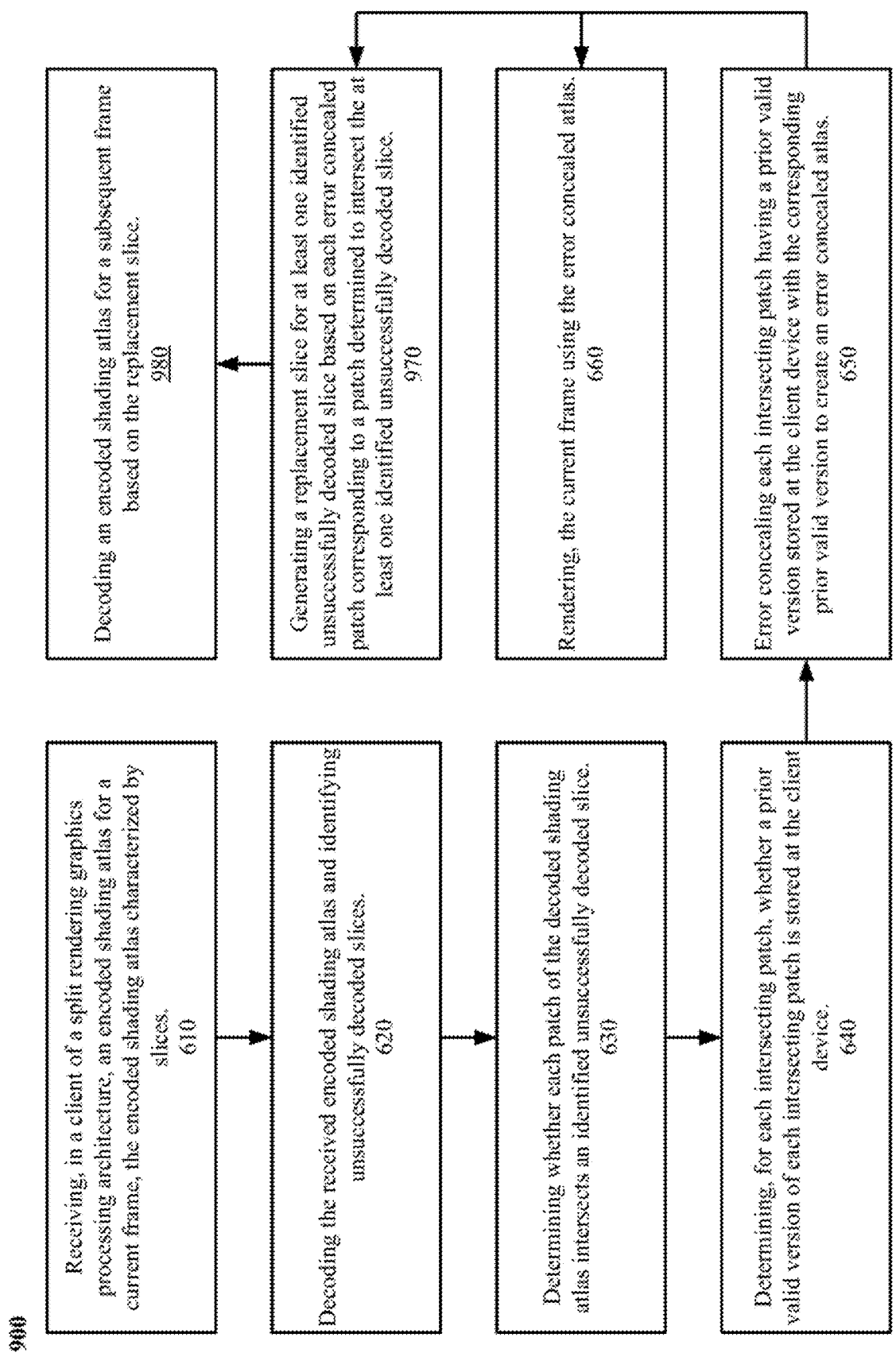
FIG. 9 is a flowchart of an example method of graphics processing, in accordance with one or more techniques of this disclosure.

Referring to FIG. 9, and continuing to refer to prior figures for context, a flowchart 900 of an example method is illustrated, in accordance with one or more techniques of this disclosure. The method may be performed by an apparatus such as one or more of a client device, a CPU, a GPU, or an apparatus for graphics and/or video processing. In such methods, Block 610-Block 660 are performed as described above in connection with FIG. 6.

In such methods 900, the client device generates a replacement slice for at least one identified unsuccessfully decoded slice based on each error concealed patch corresponding to a patch determined to intersect the at least one identified unsuccessfully decoded slice—Block 970. In the continuing example, Vdec regeneration 560 stage uses concealed patch information 546 to generate error concealed slices 562; though this function can be performed integral to the video decoding 510 stage. In such methods, the client device then decodes an encoded shading atlas for a subsequent frame based on the replacement slice—Block 980.

In some aspects, the at least one shading atlas including the one or more blocks can be received from a server, an edge server, or a cloud server, as described in connection with the examples in FIGS. 2A, 2B, and 3-5. Also, the at least one shading atlas including the one or more blocks can be received by a client device, a headset, or a head mounted display (HMD), as described in connection with the examples in FIGS. 2A, 2B, and 3-5. In some instances, the determination whether the at least one block of the one or more blocks is accurately decoded can be at least partially performed by a GPU or a CPU, as described in connection with the examples in FIGS. 2A, 2B, and 3-5. Further, the at least one shading atlas including the one or more blocks can be received for an XR application, an AR application, or a VR application, as described in connection with the examples in FIGS. 2A, 2B, and 3-5. In some aspects, the previous pixel information can include the stored updated pixel information, as described in connection with the examples in FIGS. 2A, 2B, and 3-5. In some aspects, the portion of the frame may correspond to a portion of at least one eye buffer, as described in connection with the examples in FIGS. 2A, 2B, and 3-5.

In some examples, a method or apparatus for graphics processing is provided. The apparatus may be a server, a client device, a CPU, a GPU, or some other processor that can perform graphics processing. In one aspect, the apparatus may be the processing unit 120 within the device 104 or may be some other hardware within device 104 or another device. The apparatus may include means for receiving, as part of a vector streaming split rendering process, a bit stream expected to encode blocks of a shading atlas of each of: a first frame of the process, and a subsequent frame of the process; means for attempting to decode each of the blocks of the first frame; means for determining that the attempted decoding of a first block of the first frame was successful; means for storing the first block determined successfully decoded; means for attempting to decode each of the blocks of the subsequent frame; means for determining, subsequent to the storing, that the attempted decoding of a particular block of the subsequent frame was unsuccessful; means for identifying the stored first block as an earlier version of the particular block determined unsuccessfully decoded; and means for rendering the subsequent frame using the stored first block instead of the particular block.

The subject matter described herein can be implemented to realize one or more benefits or advantages. For instance, the described graphics processing techniques can be used by a server, a client, a GPU, a CPU, or some other processor that can perform graphics processing to implement the error concealment techniques described herein. This can also be accomplished at a low cost compared to other graphics processing techniques. Moreover, the graphics processing techniques herein can improve or speed up data processing or execution. Further, the graphics processing techniques herein can improve resource or data utilization and/or resource efficiency. Additionally, aspects of the present disclosure can utilize an error concealment process that can increase the accuracy of missing block or information transferred in split rendering and/or vector streaming.

In accordance with this disclosure, the term "or" may be interrupted as "and/or" where context does not dictate otherwise. Additionally, while phrases such as "one or more" or "at least one" or the like may have been used for some features disclosed herein but not others, the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, the techniques could be fully implemented in one or more circuits or logic elements.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of interoperative hardware units, including one or more processors as described above, in conjunction with suitable software and/or firmware. Various examples have been described. These and other examples are within the scope of the following claims.

What is claimed is:
1. A method of graphics processing, comprising:
in a client device of a split rendering graphics processing architecture:
receiving an encoded shading atlas for a current frame, the encoded shading atlas characterized by slices;
decoding the received encoded shading atlas and identifying unsuccessfully decoded slices;
determining whether each patch of the decoded shading atlas intersects an identified unsuccessfully decoded slice;

determining, for each intersecting patch, whether a prior valid version of each intersecting patch is stored at the client device;

error concealing each intersecting patch having a prior valid version stored at the client device with the corresponding prior valid version to create an error concealed atlas; and rendering, the current frame using the error concealed atlas.

2. The method of claim 1:

further comprising accumulating, by the client device, a list comprising a patch identifier for each patch of the shading atlas and a location in the shading atlas for the patch corresponding to each patch identifier, wherein determining whether each patch of the decoded shading atlas intersects an unsuccessfully decoded slice is based on the accumulated list.

3. The method of claim 1:

further comprising, indicating each region of the error concealed atlas corresponding to an intersecting patch determined not to correspond to a prior valid version, wherein rendering the current frame further comprises rendering using in-painting for each indicated region.

4. The method of claim 1, wherein the prior valid version of the intersecting patch is the version of the intersecting patch used to render an immediately preceding frame.

5. The method of claim 1, wherein the client device is a client device for an extended reality (XR) application, an augmented reality (AR) application, a virtual reality (VR) application, or a cloud gaming application.

6. The method of claim 5, wherein the client device is a headset, a multimedia console, or a head mounted display (HMD).

7. The method of claim 1, further comprising:

generating a replacement slice for at least one identified unsuccessfully decoded slice based on each error concealed patch corresponding to a patch determined to intersect the at least one identified unsuccessfully decoded slice; and decoding an encoded shading atlas for a subsequent frame based on the replacement slice.

8. An apparatus for graphics processing, comprising:

memory storing instructions executable by at least one processor; and at least one processor coupled to the memory and configured, as a client device of a split rendering graphics processing architecture, to execute the instructions to:

receive an encoded shading atlas for a current frame, the encoded shading atlas characterized by slices;

decode the received encoded shading atlas and identify unsuccessfully decoded slices;

determine whether each patch of the decoded shading atlas intersects an identified unsuccessfully decoded slice;

determine, for each intersecting patch, whether a prior valid version of each intersecting patch is stored at the client device;

error conceal each intersecting patch having a prior valid version stored at the client device with the corresponding prior valid version to create an error concealed atlas; and render, the current frame using the error concealed atlas.

9. The apparatus of claim 8:

wherein the at least one processor is further configured to execute the instructions to accumulate a list comprising a patch identifier for each patch of the shading atlas and a location in the shading atlas for the patch corresponding to each patch identifier, wherein determining whether each patch of the decoded shading atlas intersects an unsuccessfully decoded slice is based on the accumulated list.

10. The apparatus of claim 8:

wherein the at least one processor is further configured to execute the instructions to indicate each region of the error concealed atlas corresponding to an intersecting patch determined not to correspond to a prior valid version, wherein rendering the current frame further comprises rendering using in-painting for each indicated region.

11. The apparatus of claim 8, wherein the prior valid version of the intersecting patch is the version of the intersecting patch used to render an immediately preceding frame.

12. The apparatus of claim 8, wherein the client device is a client device for an extended reality (XR) application, an augmented reality (AR) application, a virtual reality (VR) application, or a cloud gaming application.

13. The apparatus of claim 12, wherein the client device is a headset, a multimedia console, or a head mounted display (HMD).

14. The apparatus of claim 8, wherein the at least one processor is further configured to execute the instructions to:

generate a replacement slice for at least one identified unsuccessfully decoded slice based on each error concealed patch corresponding to a patch determined to intersect the at least one identified unsuccessfully decoded slice; and decode an encoded shading atlas for a subsequent frame based on the replacement slice.

15. An apparatus for graphics processing in a split rendering architecture in a client device, comprising:

means for receiving an encoded shading atlas for a current frame, the encoded shading atlas characterized by slices;

means for decoding the received encoded shading atlas and identifying unsuccessfully decoded slices;

means for determining whether each patch of the decoded shading atlas intersects an identified unsuccessfully decoded slice;

means for determining, for each intersecting patch, whether a prior valid version of each intersecting patch is stored at the client device;

means for error concealing each intersecting patch having a prior valid version stored at the client device with the corresponding prior valid version to create an error concealed atlas; and means for rendering, the current frame using the error concealed atlas.

16. The apparatus of claim 15:

further comprising means for accumulating, by the client device, a list comprising a patch identifier for each patch of the shading atlas and a location in the shading atlas for the patch corresponding to each patch identifier, wherein means for determining whether each patch of the decoded shading atlas intersects an unsuccessfully decoded slice is based on the accumulated list.

17. The apparatus of claim 15:

further comprising, means for indicating each region of the error concealed atlas corresponding to an intersecting patch determined not to correspond to a prior valid version, wherein means for rendering the current frame further comprises means for rendering using in-painting for each indicated region.

18. The apparatus of claim 15, wherein the prior valid version of the intersecting patch is the version of the intersecting patch used to render an immediately preceding frame.

19. The apparatus of claim 15, wherein the client device is a client device for an extended reality (XR) application, an augmented reality (AR) application, a virtual reality (VR) application, or a cloud gaming application.

20. The apparatus of claim 19, wherein the client device is a headset, a multimedia console, or a head mounted display (HMD).

21. The apparatus of claim 15, further comprising:
means for generating a replacement slice for at least one identified unsuccessfully decoded slice based on each error concealed patch corresponding to a patch determined to intersect the at least one identified unsuccessfully decoded slice; and
means for decoding an encoded shading atlas for a subsequent frame based on the replacement slice.

22. A non-transitory computer-readable medium storing computer executable code for graphics processing by a client device in a split rendering architecture, the code when executed by a processor causes the processor to: receive an encoded shading atlas for a current frame, the encoded shading atlas characterized by slices; decode the received encoded shading atlas and identify unsuccessfully decoded slices; determine whether each patch of the decoded shading atlas intersects an identified unsuccessfully decoded slice; determine, for each intersecting patch, whether a prior valid version of each intersecting patch is stored at the client device; error conceal each intersecting patch having a prior valid version stored at the client device with the corresponding prior valid version to create an error concealed atlas; and render, the current frame using the error concealed atlas.

23. The non-transitory computer-readable medium of claim 22: wherein the code when executed by a processor further causes the processor to accumulate a list comprising a patch identifier for each patch of the shading atlas and a location in the shading atlas for the patch corresponding to each patch identifier, wherein determining whether each patch of the decoded shading atlas intersects an unsuccessfully decoded slice is based on the accumulated list.

24. The non-transitory computer-readable medium of claim 22: wherein the code when executed by a processor further causes the processor to indicate each region of the error concealed atlas corresponding to an intersecting patch determined not to correspond to a prior valid version; wherein rendering the current frame further comprises rendering using in-painting for each indicated region.

25. The non-transitory computer-readable medium of claim 22, wherein the prior valid version of the intersecting patch is the version of the intersecting patch used to render an immediately preceding frame.

26. The non-transitory computer-readable medium of claim 22, wherein the client device is a client device for an extended reality (XR) application, an augmented reality (AR) application, a virtual reality (VR) application, or a cloud gaming application.

27. The non-transitory computer-readable medium of claim 26, wherein the client device is a headset, a multimedia console, or a head mounted display (HMD).

28. The non-transitory computer-readable medium of claim 22, wherein the code when executed by a processor further causes the processor to: generate a replacement slice for at least one identified unsuccessfully decoded slice based on each error concealed patch corresponding to a patch determined to intersect the at least one identified unsuccessfully decoded slice; and decode an encoded shading atlas for a subsequent frame based on the replacement slice.

\* \* \* \* \*